(12) United States Patent
French et al.

(10) Patent No.: US 12,030,391 B2
(45) Date of Patent: Jul. 9, 2024

(54) MODULAR BICYCLE DESIGNS

(71) Applicant: Lyft, Inc., San Francisco, CA (US)

(72) Inventors: Merric French, San Francisco, CA (US); Rochus Jacob, San Francisco, CA (US); Oliver Mueller, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 880 days.

(21) Appl. No.: 16/710,557

(22) Filed: Dec. 11, 2019

(65) Prior Publication Data
US 2021/0178914 A1 Jun. 17, 2021

(51) Int. Cl.
| | |
|---|---|
| *B60L 50/60* | (2019.01) |
| *B60L 53/80* | (2019.01) |
| *B62J 1/04* | (2006.01) |
| *B62J 6/26* | (2020.01) |
| *B62J 43/28* | (2020.01) |
| *B62J 7/04* | (2006.01) |
| *B62J 7/06* | (2006.01) |

(52) U.S. Cl.
CPC .............. *B60L 50/66* (2019.02); *B60L 53/80* (2019.02); *B62J 43/28* (2020.02); *B60L 2200/12* (2013.01); *B60L 2200/24* (2013.01); *B62J 1/04* (2013.01); *B62J 6/26* (2020.02); *B62J 7/04* (2013.01); *B62J 7/06* (2013.01)

(58) Field of Classification Search
CPC .......... B60L 50/66; B60L 50/64; B60L 50/22; B60L 53/80; B60L 58/18; B60L 2200/12; B60L 2200/24; B60L 2200/22; B60L 1/14; B62J 43/28; B62J 43/20; B62J 43/13; B62J 43/23; B62J 1/04; B62J 6/26; B62J 7/04; B62J 7/06; B62J 9/10; B62J 50/22; G01C 21/3469
See application file for complete search history.

(56) References Cited

U.S. PATENT DOCUMENTS

| | | | |
|---|---|---|---|
| 4,901,209 A | * | 2/1990 | Nitz ........................... B62J 6/26 280/281.1 |
| 5,789,898 A | * | 8/1998 | Suzuki .................... B60L 50/66 180/68.5 |

(Continued)

FOREIGN PATENT DOCUMENTS

| | | | | |
|---|---|---|---|---|
| CN | 203172815 U | * | 9/2013 | |
| CN | 102738421 B | * | 10/2014 | .............. B62M 6/90 |

(Continued)

*Primary Examiner* — Steve Clemmons
(74) *Attorney, Agent, or Firm* — Baker Botts L.L.P.

(57) ABSTRACT

Techniques are disclosed for systems and methods to provide a configurable electric micro-mobility vehicle that can be configured with modular accessories. The micro-mobility vehicle is configurable by including a structure that is adapted to receive and secure one or more of the modular accessories within a short amount of time. The micro-mobility vehicle may include a battery compartment for receiving a modular battery pack and securing the battery pack to an electrical connector of the micro-mobility vehicle. The battery compartment may be physically coupled to a seat tube of the micro-mobility vehicle. The battery compartment may include an opening at one end of the battery compartment for inserting and removing a battery pack.

20 Claims, 23 Drawing Sheets

(56) References Cited

U.S. PATENT DOCUMENTS

| | | | | |
|---|---|---|---|---|
| 5,934,401 | A * | 8/1999 | Mayer | B62M 6/60 |
| | | | | 180/220 |
| 6,016,882 | A * | 1/2000 | Ishikawa | B62K 19/46 |
| | | | | 180/68.5 |
| 7,117,966 | B2 * | 10/2006 | Kohda | B60L 53/80 |
| | | | | 180/68.5 |
| 7,393,125 | B1 * | 7/2008 | Lai | B62M 6/80 |
| | | | | 280/281.1 |
| 7,950,835 | B2 * | 5/2011 | Carillo | B62J 6/26 |
| | | | | 340/432 |
| 8,408,349 | B1 * | 4/2013 | Vollmer | B62M 6/40 |
| | | | | 180/68.5 |
| 8,413,947 | B2 * | 4/2013 | Chiang | H01M 50/244 |
| | | | | 206/703 |
| 8,651,212 | B2 * | 2/2014 | Vincenz | B62M 6/90 |
| | | | | 180/205.1 |
| 8,989,954 | B1 * | 3/2015 | Addepalli | B60W 50/10 |
| | | | | 701/32.7 |
| 9,168,975 | B1 * | 10/2015 | Schieffelin | B62J 9/23 |
| 9,381,973 | B2 * | 7/2016 | Williams | B62K 19/18 |
| 9,527,398 | B2 * | 12/2016 | Duer | B60L 58/13 |
| 10,295,355 | B2 * | 5/2019 | Baglino | G01C 21/3697 |
| 10,513,188 | B2 * | 12/2019 | Carmignani | B60L 50/64 |
| 10,513,310 | B2 * | 12/2019 | Fujiwara | H01M 50/249 |
| 10,800,475 | B1 * | 10/2020 | Luedtke | B62J 45/422 |
| 10,868,288 | B2 * | 12/2020 | Nishihara | H01M 50/576 |
| 11,002,557 | B2 * | 5/2021 | Pedersen | G05D 1/0217 |
| 11,052,968 | B2 * | 7/2021 | Slaoui | B62M 6/40 |
| 11,485,241 | B2 * | 11/2022 | Stephens | B60L 53/14 |
| 11,498,478 | B2 * | 11/2022 | Wendt | B60Q 1/085 |
| 11,535,331 | B2 * | 12/2022 | Lee | B62M 6/90 |
| 2011/0240391 | A1 * | 10/2011 | Bonneville | B60L 50/52 |
| | | | | 180/220 |
| 2014/0183839 | A1 * | 7/2014 | Dal Pozzo | B62J 11/04 |
| | | | | 280/288.4 |
| 2015/0039391 | A1 * | 2/2015 | Hershkovitz | G06Q 30/0202 |
| | | | | 705/7.31 |
| 2017/0146354 | A1 * | 5/2017 | Boss | G01C 21/3438 |
| 2018/0111652 | A1 * | 4/2018 | Halevi | B62H 5/001 |

FOREIGN PATENT DOCUMENTS

| | | | | |
|---|---|---|---|---|
| CN | 109319035 A | * | 2/2019 | ............ B62K 19/30 |
| EP | 2476575 A1 | | 7/2012 | ............ B60L 11/007 |
| JP | H10155205 A | * | 6/1998 | |
| JP | 2000335463 A | * | 12/2000 | ............ B60K 1/04 |
| WO | WO-2020208654 A1 | * | 10/2020 | |
| WO | WO-2021037513 A1 | * | 3/2021 | ............ B62J 11/19 |

* cited by examiner

MODULAR BICYCLE DESIGNS

TECHNICAL FIELD

One or more embodiments of the present disclosure relate generally to electric bicycles and more particularly, to electric bicycles that are configurable with modular accessories.

BACKGROUND

Contemporary transportation services often rely on a network of sharable vehicles that is ready for hire anytime and anywhere. For example, batches of single-rider (or possibly two-rider) vehicles such as electric bicycles and scooters alike may be placed in different locations of a city that enable users to easily hire and return the vehicles as needed. However, different users may desire such vehicles in different configurations based on their different needs. Providing different types of vehicles (e.g., in different configurations and/or arrangements) ready to be hired can be costly and inefficient, especially when demands for the different configurations of the vehicles may change over time. Therefore, there is a need in the art for configurable vehicles, in particular, electric bicycles that can be adapted with different modular accessories.

SUMMARY

Techniques are disclosed for systems and methods to provide a configurable electric micro-mobility vehicle that can be configured with modular accessories. In accordance with one or more embodiments, a micro-mobility vehicle may include a frame comprising a seat tube; a first wheel and a second wheel; an electric motor configured to mobilize at least the first wheel; a battery pack comprising a connector; an electrical connector configured to receive electrical power from the battery pack and transfer the electrical power to the electric motor; and a battery compartment physically coupled to the seat tube and configured to secure the connector of the battery pack to the electrical connector, wherein the battery compartment comprises an opening at a first end that enables the battery pack to slide in and out of the battery compartment along a direction substantially parallel or perpendicular to the seat tube.

In other embodiments, a method may include determining that a charge level of a first battery pack connected to a micro-mobility vehicle is below a threshold; in response to the determining, removing the first battery pack by sliding the first battery pack out of a battery compartment of the micro-mobility vehicle through an opening of the battery compartment in a direction that is substantially parallel or perpendicular to a seat tube of the micro-mobility vehicle, wherein the battery compartment is physically coupled to the seat tube; and connecting a second battery pack to the micro-mobility vehicle by sliding the second battery pack along the direction into the battery compartment through the opening.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
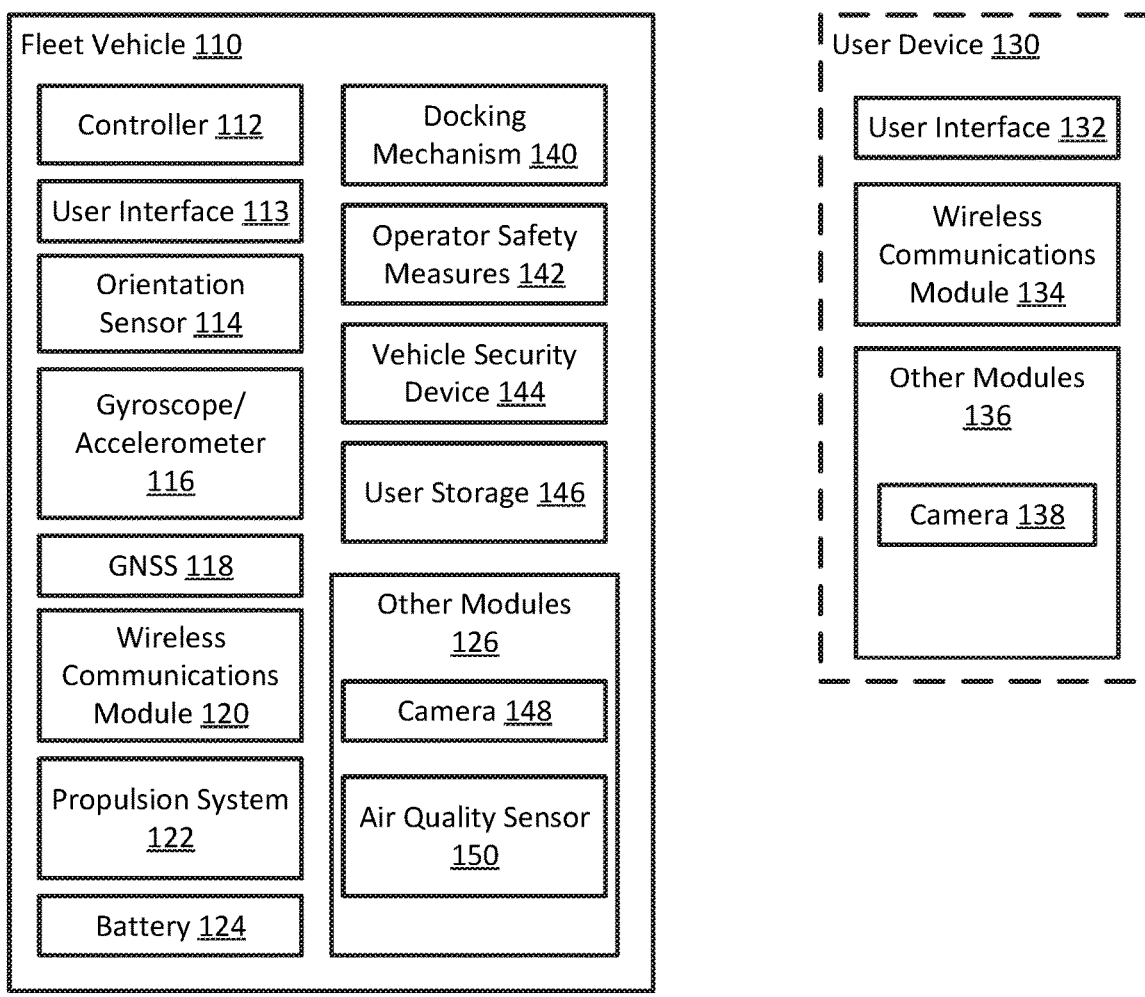
FIG. 1 illustrates a block diagram of a portion of a dynamic transportation matching system including a fleet vehicle in accordance with an embodiment of the disclosure.

In accordance with various embodiments of the present disclosure, systems and methods provide a configurable electric micro-mobility vehicle that can be configured with modular accessories. A micro-mobility vehicle may be a single-user (or double-user) vehicle such as a bicycle or a scooter designed for traveling in short distances (e.g., less than 5 miles, less than 10 miles, etc.) relative to conventional shared vehicles, such as cars. The micro-mobility vehicle may include at least two wheels, an electric propulsion system (e.g., an electric motor) for mobilizing the micro-mobility vehicle (e.g., for mobilizing at least one of the wheels), a handle bar for steering the micro-mobility vehicle, and a frame that includes at least a head tube for supporting the handle bar, a seat tube for supporting a saddle (e.g., a seat), and a down tube that connects the head tube and the seat tube.

In some embodiments, the micro-mobility vehicle is configurable by including a structure that is adapted to receive and secure one or more of the modular accessories within a short amount of time (e.g., within 10 seconds, within a minute, etc.). Thus, a user (including the rider or a service technician or employee of the entity managing the micro-mobility vehicle) may configure (e.g., transform) the micro-mobility vehicle in different configurations quickly based on different needs. For example, in some embodiments, the micro-mobility vehicle may include a battery compartment for receiving a modular battery pack and securing the battery pack to an electrical connector of the micro-mobility vehicle. A wire or cable may connect the electrical connector to the electric propulsion system of the micro-mobility vehicle to transfer the electric power from the battery pack to the electric propulsion system.

In some embodiments, the battery compartment may be physically coupled to the seat tube for easy access. For example, the battery compartment may have a long dimension that runs substantially parallel (e.g., less than 10% deviation, etc.) to the length of the seat tube. The battery compartment may have an opening at a first end for inserting and removing a battery pack. As such, a battery pack may be inserted into the battery compartment by sliding the battery pack through the opening in the first end into the battery compartment in a direction that is substantially parallel to the length of the seat tube. Similarly, the battery pack may be removed from the battery compartment by sliding the battery pack through the opening in the first end out of the battery compartment in a direction that is substantially parallel to the length of the seat tube. In some embodiments, the opening is beneath the saddle. As such, in order to insert or remove a battery pack, an orientation of the saddle needs to be adjusted (e.g., tilting the saddle along an axis that is perpendicular to the frame of the micro-mobility vehicle). In some embodiments, the battery compartment is part of the seat tube. In other embodiments, the battery compartment is separate from the seat tube but is physically coupled to the seat tube (e.g., affixed to the seat tube, etc.).

In another example, the battery compartment extends out of the seat tube and is substantially perpendicular (e.g., within 10% deviation, within 20% deviation, etc.) to the seat tube. In some embodiments, the battery compartment may be substantially parallel (e.g., within 10% deviation) to the ground when the micro-mobility vehicle is in an operating orientation. The battery compartment may also have an opening at a first end of the battery compartment for inserting and/or removing a battery pack, while a second end of the battery compartment is physically coupled to the seat tube of the micro-mobility vehicle. The battery pack may be inserted into and/or removed from the battery compartment by sliding the battery pack through the opening in the first end in a direction substantially (e.g., within 10%) parallel to the length of the battery compartment.

In some embodiments, the battery compartment that extends out of the seat tube may be disposed below the saddle and above a wheel (e.g., the rear wheel) of the micro-mobility vehicle. In other embodiments, the battery compartment may be disposed at the bottom of the seat tube and may extend toward the rear wheel to mimic a chain box of the micro-mobility vehicle.

In some embodiments, the battery pack has one or more electrical connectors at one end of the battery pack. Once the battery pack is inserted into the battery compartment (with the end having the one or more electrical connectors entering into the battery compartment first), a mechanism (e.g., a lock) may secure the battery pack in place while the one or more electrical connectors of the battery pack is in contact with the electrical connector of the micro-mobility vehicle such that the one or more electrical connectors of the battery pack remains in contact with the electrical connector of the micro-mobility vehicle during operation of the micro-mobility vehicle. The lock may be configured such that it can be released by pressing on a button, using a key (electronic or physical), entering a code, or by pulling the battery pack using a force that exceeds a threshold.

In some embodiments, the battery pack and/or the battery compartment may be configured to provide an indicator (e.g., a visual indicator, an audio indicator, or a combination of the two) indicating a charge level of the battery pack. For example, the visual indicator may include a series of lights, where a number of lights in the series of lights may be lit to indicate a charge level of the battery pack. In such an example, a fully lit series of lights may indicate that the battery pack is above a charge level threshold (e.g., 95%, 98%, etc.), and a fully unlit series of lights may indicate that the battery pack is at a charge level below a threshold (e.g., 5%, 1%, etc.). In another example, the visual indicator may include a light bar, where a lit portion of the light bar represents a charge level of the battery pack (e.g., a fully lit light bar represents a charge level above a threshold such as 95%, a half lit light bar represents a charge level above another threshold such as 50%, etc.). The visual indicator may be triggered automatically (e.g., presented all the time, presented periodically such as every 5 seconds, etc.), or may be triggered in response to a signal or condition, such as when the charge level drops below or exceeds a certain threshold. In one embodiment, the battery pack and/or the battery compartment may have a button, that when pressed, triggers the visual indicator to indicate a charge level of the battery pack inside the battery compartment.

When the battery pack itself provides the visual indicator, the visual indicator may be disposed on an exterior surface of the battery pack that is visible to users when the battery pack is secured within the battery compartment. For example, when the battery pack is secured within the battery compartment, a portion of the battery pack may protrude from the battery compartment (e.g., through the opening). The visual indicator may be disposed on the exterior surface of that portion of the battery pack. Having a portion of the battery pack protruding from the battery compartment through the opening even when the battery pack is secured within the battery compartment is also useful to enable easy removal of the battery pack from the battery compartment. In some embodiments, the protruding portion may have a larger circumference than the remaining portion of the battery pack such that a user may easily grab the protruding portion of the battery pack to pull the battery pack out of the battery compartment. In such embodiments, a locking mechanism may be employed to prevent the battery pack from being stolen or possibly falling out. An example of suitable locking mechanism may include a physical engagement that enables the battery pack to slide in, but not out, unless a key or other unlocking mechanism is used to disengage the physical engagement. Other types are also contemplated in which a component can be secured through an open end of a component once inserted.

The indicator enables users (e.g., riders of the micro-mobility vehicle, maintenance workers of the micro-mobility vehicle, etc.) to quickly determine a charge level of the battery pack connected to the micro-mobility vehicle, such that they can determine whether there is a need to replace and/or charge the battery pack for the micro-mobility vehicle. For example, a user who desires to hire the micro-mobility vehicle may quickly determine the charge level of the battery pack connected to the micro-mobility vehicle based on the visual and/or audio indicator. The user may then decide whether the micro-mobility vehicle has sufficient charge to transport the user to the intended destination. The user may proceed to replace or charge the battery pack when it is determined that the charge level is lower than desired.

In another example, the micro-mobility vehicle may belong to a fleet of similar micro-mobility vehicles. Batches of the micro-mobility vehicles may be located at different stations within a geographical area. The fleet of micro-mobility vehicles may be communicatively coupled with each other and with a server via a network (e.g., a mesh network, a wide area network, a cellular network, etc.). When the charge level of the battery pack of a micro-mobility vehicle is below a threshold (e.g., 10%, 5%, etc.), the micro-mobility vehicle may be configured to transmit a signal to the server. The threshold may depend on the intended use or duration of use of the micro-mobility vehicle. For example, if the intended use from point A to point B includes steep inclines, the threshold may be higher such that the user does not run out of power during the ride, or if the intended use is a short strip from point C to point D that is mostly flat and downhill, the threshold may be lower. The signal may include a current location of the micro-mobility vehicle and/or an identifier of the micro-mobility vehicle. The server may dispatch a maintenance worker to service the micro-mobility vehicle based on the low charge level signal. Since the micro-mobility vehicles may be located at a station along with other similar micro-mobility vehicles, the maintenance worker may use the visual indicator and/or the audio indicator to determine which of the micro-mobility vehicles have low battery charge levels, and may proceed to charge and/or replace the batteries for the micro-mobility vehicles that have low battery charge levels.

In addition to the visual indicator for indicating a charge level of the battery pack, the battery pack and/or the battery compartment may also provide additional lighting (e.g., a light strip, a light bulb, etc.) to improve safety while riding at night.

In some embodiments, the battery compartment may be configured to receive and secure battery packs having different sizes (corresponding to different power capacity and/or efficiency). For example, the battery compartment may be configured to secure battery packs having different lengths. A longer battery pack may have a larger portion of the battery pack protruding from the opening of the battery compartment where a shorter battery pack may have a smaller portion of the battery pack protruding from the opening of the battery compartment. Having a battery compartment that can secure battery packs of different sizes enables the micro-mobility vehicle to be configured with different power capacity by simply changing the battery packs without modifying any structural elements of the micro-mobility vehicle. For example, a smaller (e.g., lighter weight) battery pack may be connected to the micro-mobility vehicle by default, as the lighter weight, smaller battery pack provides quicker ride and is more power efficient. However, when a rider desires to use the micro-mobility vehicle for a longer distance ride or a ride the requires more power (e.g., inclines, lots of stops and starts such as in a congested area), a user (e.g., the rider, a maintenance worker, etc.) can easily transform the micro-mobility vehicle to have greater power capacity by swapping the smaller battery pack with a larger battery pack. The user may remove the smaller battery pack by sliding the battery pack out of the battery compartment through the opening (in a direction substantially parallel to the length of the battery compartment) and by inserting the larger battery pack by sliding the battery pack into the battery compartment through the opening (in a direction substantially parallel to the length of the battery compartment).

In addition to the battery packs, other modular accessories may also be provided to transform a micro-mobility vehicle to different configurations. For example, one or more package hauling assemblies, such as a basket, a ricksaw assembly, a saddlebag frame, and the like may be added to the micro-mobility vehicle to transform the micro-mobility vehicle into a package carrier micro-mobility vehicle. In another example, a baby seat assembly may be added to the micro-mobility vehicle to transform the micro-mobility vehicle into a baby carrying micro-mobility vehicle.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
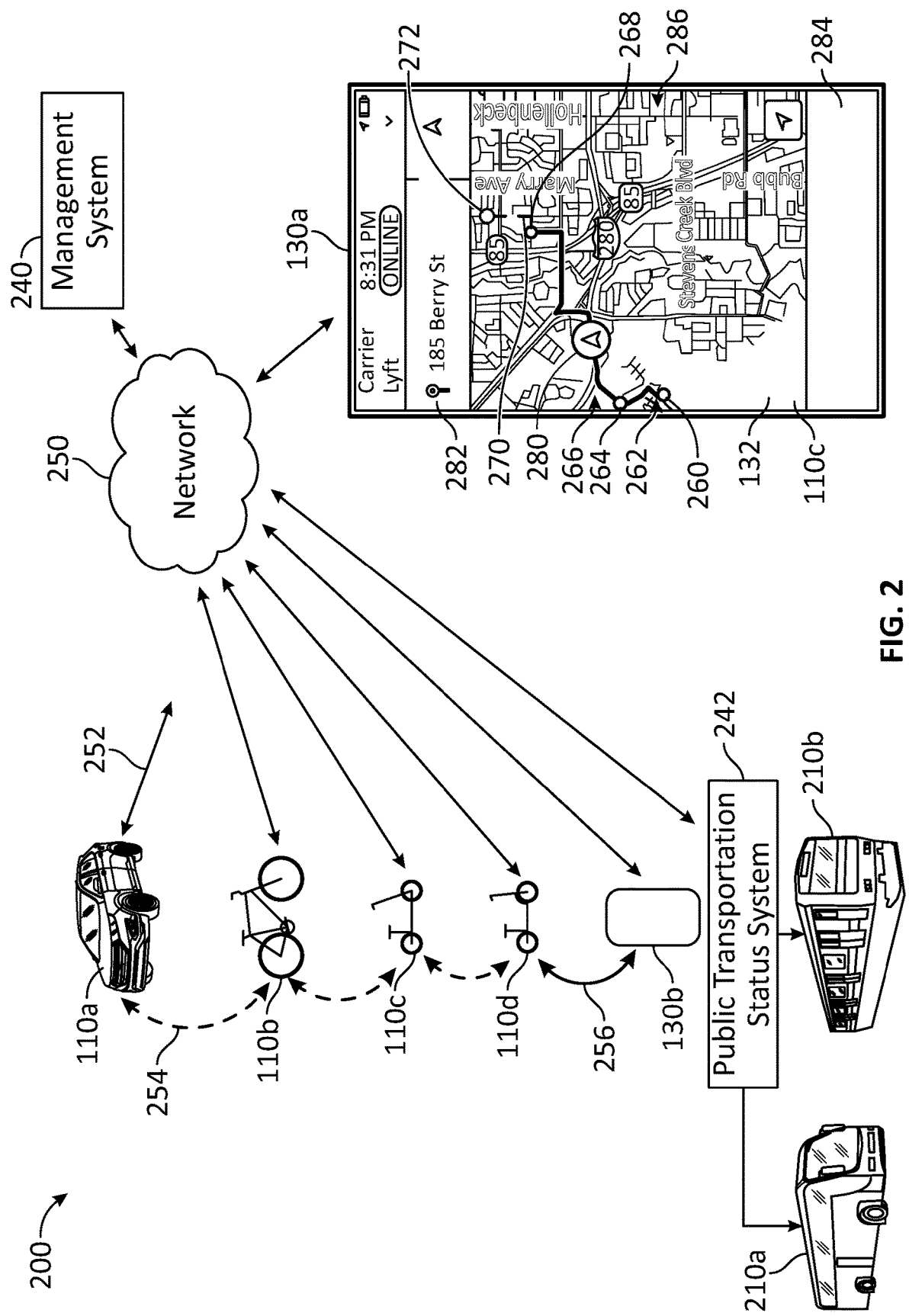
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110*a-d* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130*a* to hire or rent one of fleet vehicles 110*a-d* by transmitting a transportation request to management system 240 over WAN 250, allowing management system 240 to poll status of fleet vehicles 110*a-d* (e.g., a hire status, a battery charge level status, etc.) and to select one of fleet vehicles 110*a-d* to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130*b*, but where the requestor is able to enable a fleet vehicle over local communication link 263, as shown.

In some embodiments, each of the fleet vehicles 110*a-d* may be configured to determine a charge level of a battery connected to the fleet vehicle (e.g., using the sensor of the battery 124), and to transmit a signal to the management system 240 via the mesh network 260 and/or the WAN 250 to indicate the charge level of the battery or to indicate that the charge level is below a threshold (e.g., 20%, 10%, etc.). In some embodiments, each of the fleet vehicles 110*a-d* may be configured to also include an identifier of the fleet vehicle (e.g., a vehicle number, a serial number, etc.) and the geographical location of the fleet vehicle (e.g., the sensor information from the GNSS 118) in the signal. When the management system 240 receives the signal, the management system 240 may dispatch a user (e.g., a maintenance worker, etc.) to the location indicated in the signal to service the fleet vehicle. The location (e.g., a rental station, etc.) may include multiple fleet vehicles. As such, upon arriving at the location, the user may determine which of the fleet vehicles have low battery charge levels based on a visual indicator and/or an audio indicator presented on the battery packs or the battery compartments of the fleet vehicles, and may proceed to charge and/or replace the battery packs of the fleet vehicles having low battery charge levels.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses (e.g., hire statuses, battery charge level statuses, etc.) of fleet vehicles 110*a-d*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110*a-d*, as described herein.

User device 130*a* in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110*b*, 110*c*, or 110*d*) from bus stop 268 to destination 272. Also shown rendered by user interface 132 are present location indicator 280 (indicating a present absolute position of user device 130*a* on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130*a*, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
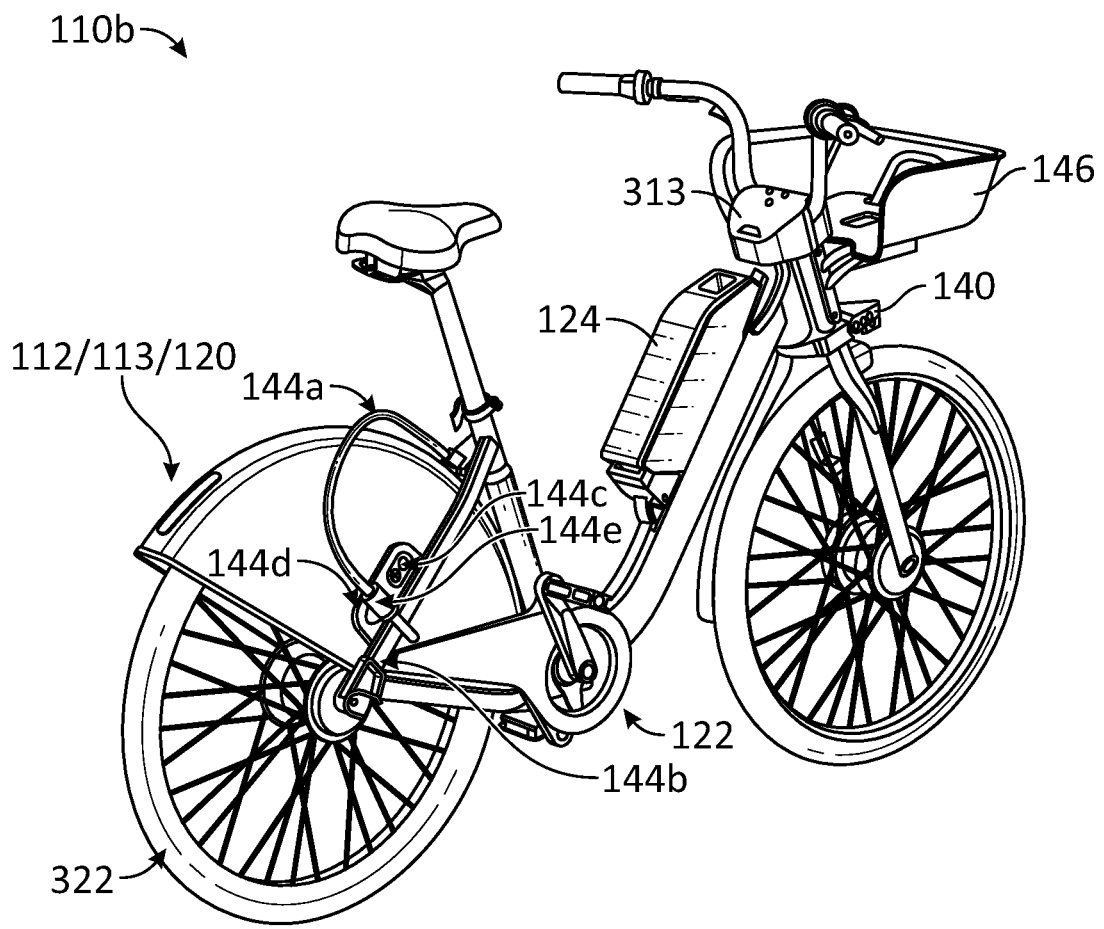
FIGS. 3A-C illustrate diagrams of micro-mobility fleet vehicles for use in a dynamic transportation matching system in accordance with embodiments of the disclosure.
Figure 3B:
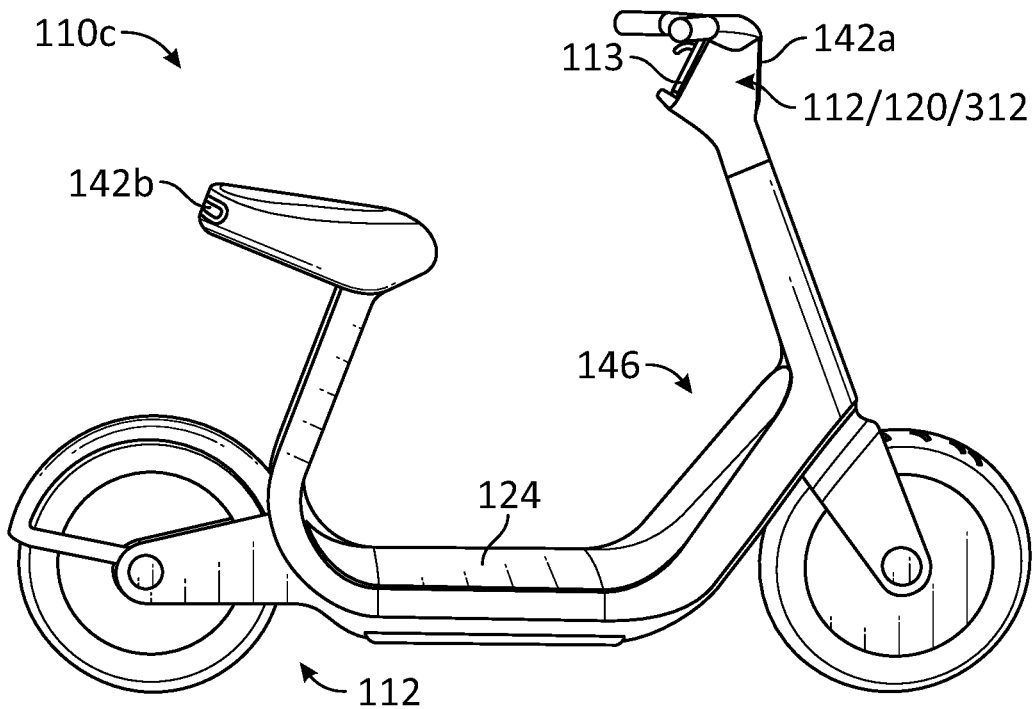
Figure 3C:
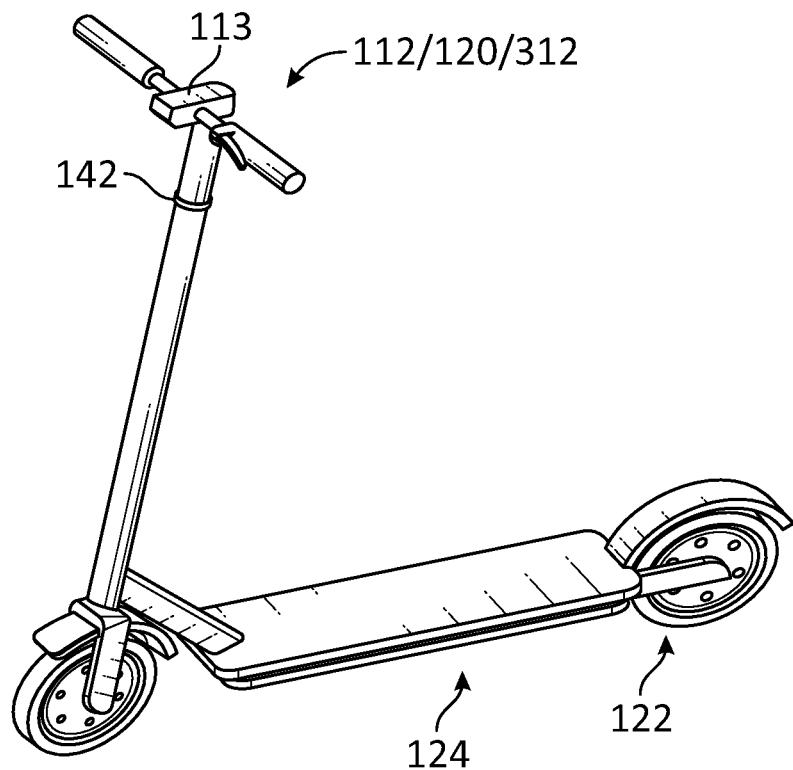

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized bicycle for hire that is integrated with the various elements of system 100 and may be configured to participate in dynamic transportation matching system 200 of FIG. 2. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110b by default, thereby requiring a user to transmit a hire request to management system 240 (e.g., via user device 130) to hire fleet vehicle 110b before attempting to use fleet vehicle 110b. The hire request may identify fleet vehicle 110b based on an identifier (e.g., a QR code, a barcode, a serial number, etc.) presented on fleet vehicle 110b (e.g., such as by user interface 113 on a rear fender of fleet vehicle 110b). Once the hire request is approved (e.g., payment is processed), management system 240 may transmit an unlock signal to fleet vehicle 110b (e.g., via network 250). Upon receiving the unlock signal, fleet vehicle 110b (e.g., controller 112 of fleet vehicle 110b) may release vehicle security device 144 and unlock rear wheel 322 of fleet vehicle 110b.

Fleet vehicle 110c of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110c includes many of the same elements as those discussed with respect to fleet vehicle 110b of FIG. 3A. For example, fleet vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Fleet vehicle 110d of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110d includes many of the same elements as those discussed with respect to fleet vehicle 110b of FIG. 3A. For example, fleet vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 4A:
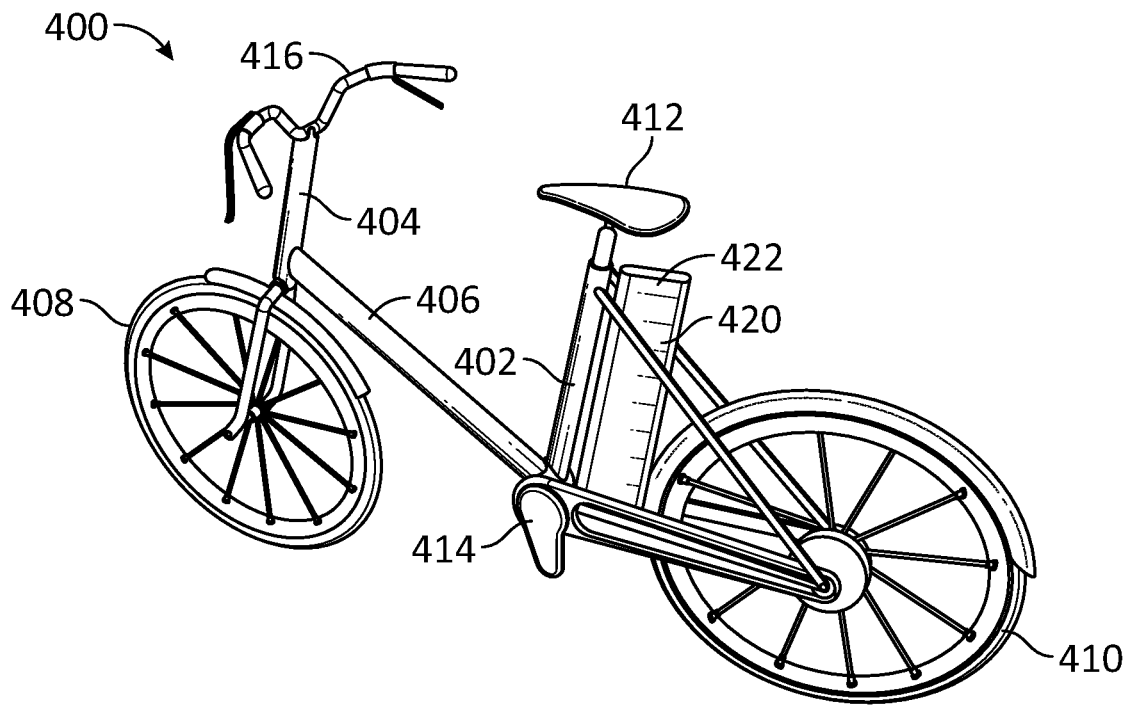
FIGS. 4A and 4B are perspective views of a micro-mobility vehicle in accordance with an embodiment of the disclosure.
Figure 4B:
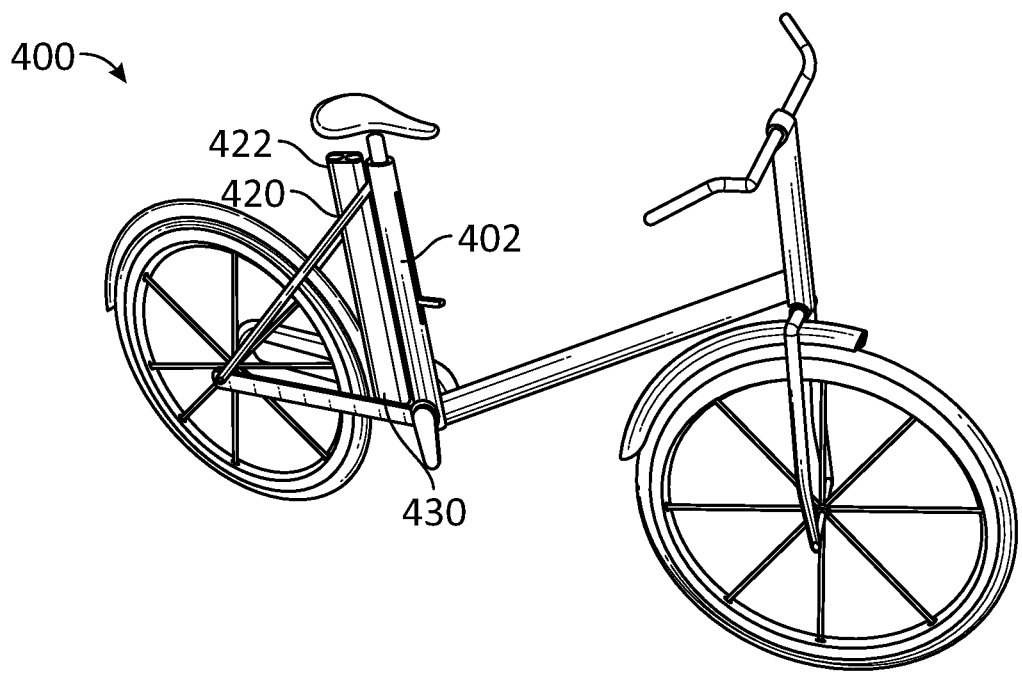

As discussed herein, the micro-mobility vehicle 300 may be constructed to be easily configurable using modular accessories, such that the micro-mobility vehicle 300 can be re-configured quickly to serve different needs of the users. FIGS. 4A and 4B are perspective views of a micro-mobility vehicle 400 having a battery compartment for receiving modular battery packs. As shown in FIG. 4A, the micro-mobility vehicle 400 is an electric bicycle having a frame comprising at least a seat tube 402 for supporting a saddle 412, a head tube 404 for supporting a handle bar 416, and a down tube 406 connecting the seat tube 402 and the head tube 404. The micro-mobility vehicle 400 may also include a front wheel 408, a rear wheel 410, and a propulsion system 414 for mobilizing the micro-mobility vehicle 400 (e.g., motorizing the rear wheel 410).

In some embodiments, the micro-mobility vehicle 400 may also include a battery compartment 420 that is configured to receive and secure modular battery packs, such as a battery pack 422. The battery compartment 420 may be disposed at a location of the micro-mobility vehicle 400 that allows different battery packs to be easily and quickly removed from and/or inserted into the battery compartment 420. For example, the battery component 420 is placed or secured with enough space above the opening such that the saddle 412 (if not easily moved) does not prevent desired battery packs from being inserted, or if the opening protrudes past the saddle 412 or the saddle 412 can be moved or adjusted, the space above the opening may not need to be a consideration. In some embodiments, the battery compartment 420 may be physically connected to the seat tube 402. In this example, the battery compartment 420 is affixed to a rear side of the seat tube 402 (e.g., the side that is farther away from the handle bar 416) and is substantially parallel (e.g., within a deviation threshold such as 5%, 10%, etc.) to the seat tube 402. FIG. 4B illustrates a different perspective view of the micro-mobility vehicle 400 having a battery compartment 420 affixed to the seat tube 402.

In some embodiments, the micro-mobility vehicle 400 may include an electrical connector 430 disposed at one end (e.g., the bottom end) of the battery compartment 420. The electrical connector 430 may be configured to transfer electrical power from the battery pack 422 to the propulsion system 414. Wiring may be provided to connect the electrical connector 430 to the propulsion system 414. As such, the battery pack 422 may also include one or more electrical connectors at one end of the battery pack 422. In some embodiments, the battery compartment 420 may enable the one or more electrical connectors of the battery pack 422 to come in contact with the electrical connector 430 of the micro-mobility vehicle 400 once the battery pack 422 is inserted into the battery compartment 420, and may also secure the battery pack 422 in place within the battery compartment 420 when the one or more electrical connectors of the battery pack 422 is in contact with the electrical connector 430 of the micro-mobility vehicle 400, such that the one or more electrical connectors of the battery pack 422 remains in contact with the electrical connector 430 of the micro-mobility vehicle 400 during operation of the micro-mobility vehicle. For example, the battery compartment 420 may provide a locking mechanism (e.g., a lock, etc.) to secure the battery pack 422 in place while the one or more electrical connectors of the battery pack 422 is in contact with the electrical connector 430 of the micro-mobility vehicle 400. The lock may be configured such that it can be released by pressing on a button, using key (physical or electronic), or pulling the battery pack using a force that exceeds a threshold.

Figure 5A:
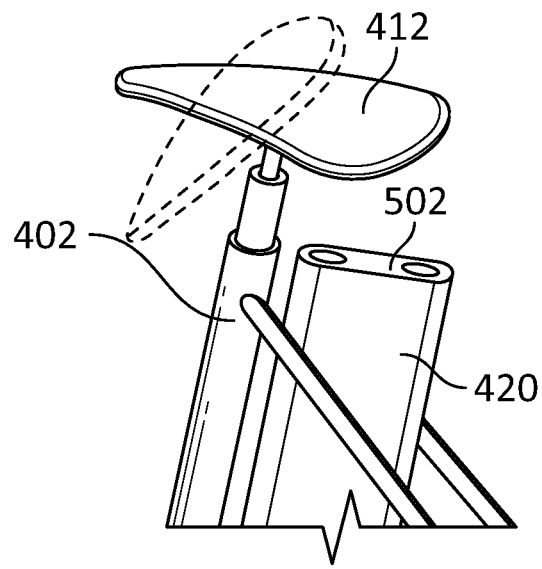
FIGS. 5A and 5B illustrate a battery compartment implementation that is integrated within a micro-mobility vehicle in accordance with an embodiment of the disclosure.
Figure 5B:
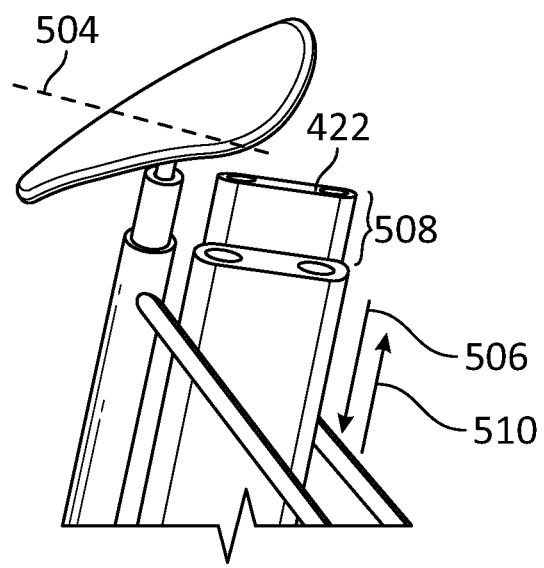

FIGS. 5A and 5B illustrate a partial view of the micro-mobility vehicle 400 and the battery compartment 420. As shown in FIG. 5A, the battery compartment 420 is affixed to the rear side of the seat tube 402 underneath the saddle 412. In some embodiments, the battery compartment 420 has an opening 502 at a top end of the battery compartment 420, which allows a battery pack to be inserted into and/or removed from the battery compartment 420. In some embodiments, since the opening 520 may be partially obstructed by the saddle 412, the micro-mobility vehicle 400 may provide a mechanism to adjust an orientation of the saddle 412 (e.g., tiling or rotating the saddle 412) to access the opening of the battery compartment 420. FIG. 5B illustrates the saddle 504 having its orientation adjusted for accessing the opening 502 of the battery compartment 420. In this example, the saddle 412 has been tilted along the invisible axis 504. After the orientation of the saddle 412 has been adjusted, a battery pack (e.g., the battery pack 422) may be inserted into the battery compartment 420 through the opening 502. In some embodiments, to insert the battery pack 422 into the battery compartment 420, the battery pack 422 may be slide through the opening 502 of the battery compartment 420 (with the end of the battery pack 422 having the one or more electrical connectors entering into the battery compartment 420 first) in a direction that is substantially parallel (e.g., within a threshold deviation such as 5%, 10%, etc.) to the length of the seat tube 402 or the length of the battery compartment 420 (as shown by the arrow 506). As discussed herein, once the battery pack 422 is fully inserted into the battery compartment 420, a locking mechanism of the battery compartment 420 may secure (e.g., by using friction or using a lever, etc.) the battery pack 422 in place. FIG. 5B illustrates the battery pack 422 after the battery pack 422 is fully inserted into and secured within the battery compartment 420. As shown, after the battery pack 422 is secured within the battery compartment 420, a portion 508 of the battery pack 422 (which includes one end of the battery pack 422) may still be protruding out of the battery compartment 420 from the opening 502. In other words, the portion 508 of the battery pack 422 is uncovered by the battery compartment 420 after the battery pack 422 is secured within the battery compartment 420. Allowing the portion 508 to be exposed from the battery compartment 420 enables the battery pack 422 to be removed from the battery compartment 420 more easily. For example, a user may grab the portion 508 of the battery pack 422 and pull in a direction substantially parallel (e.g., within a threshold deviation such as 5%, 10%, etc.) to the length of the seat tube 402 or the battery compartment 420 (as shown by the arrow 510).

Figure 6A:
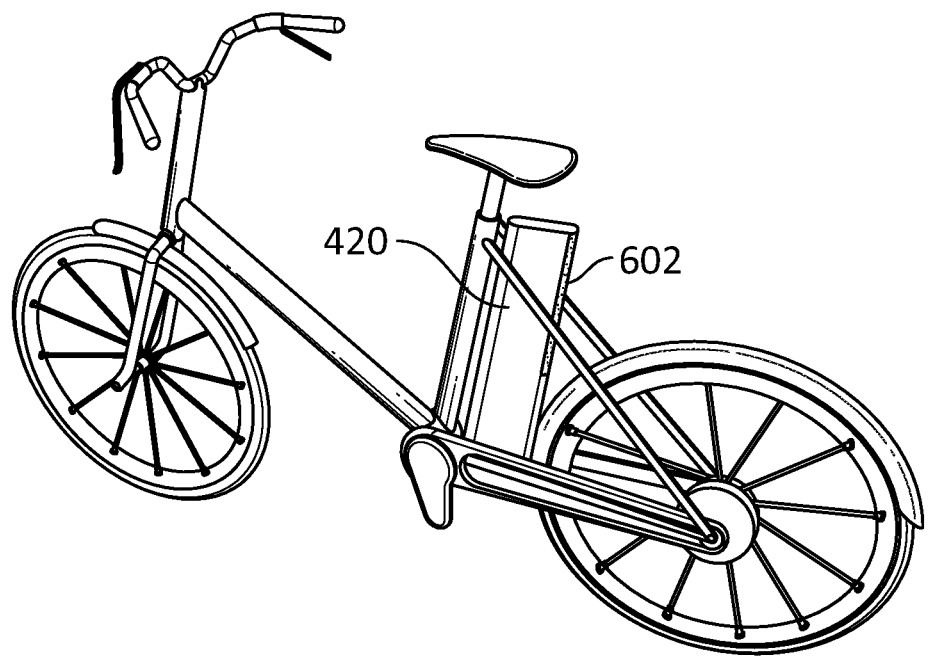
FIGS. 6A and 6B illustrate different visual indicators implemented on a surface of the battery compartment in accordance with an embodiment of the disclosure.
Figure 6B:
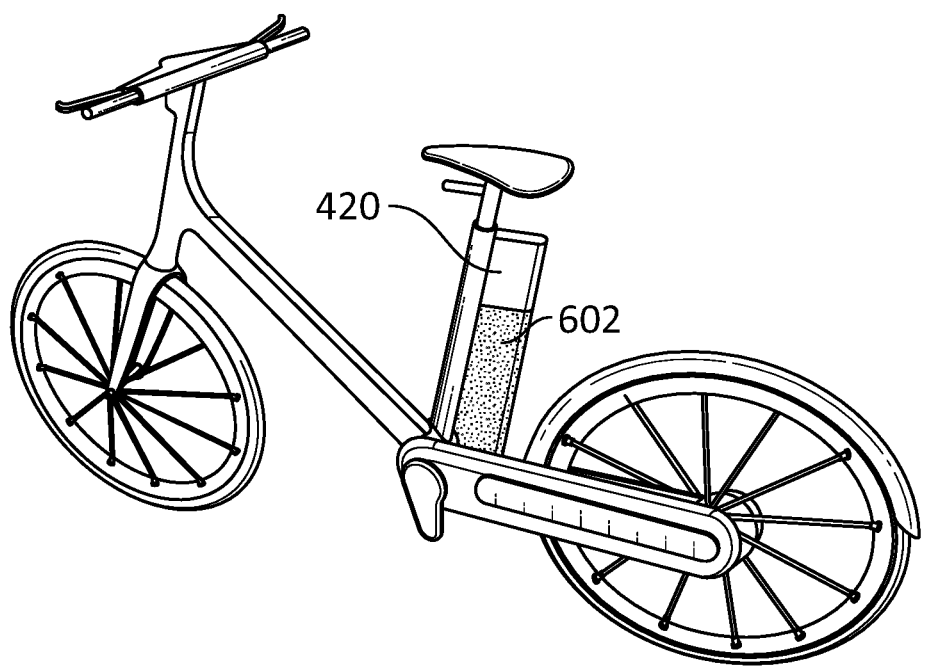

In some embodiments, the battery pack 422 and/or battery compartment 420 may be configured to provide an indicator (e.g., a visual indicator, an audio indicator, etc.) indicating a charge level of the battery pack 422. FIGS. 6A and 6B illustrates an example visual indicator that is implemented in the form of a light bar 602. In FIG. 6A, the light bar 602 is integrated within the battery compartment 420 (e.g., on the rear side exterior surface of the battery compartment 420). The light bar 602 may extend for a length along the rear side exterior surface of the battery compartment 420. The battery compartment 420 may include a battery sensor that implements the battery sensor 128 configured to determine a charge level of a battery pack inside the battery compartment 420. In some embodiments, the battery sensor may be integrated with or electrically coupled to the electrical connector 430. The battery compartment 420 may be configured to then turn on (e.g., to power) at least a portion of the light bar 602 to indicate the determined charge level of the battery pack 422. For example, the battery compartment 420 may' be configured to turn on (e.g., to power) the entire length of the light bar 602 when the charge level of the battery pack 422 exceeds a first threshold (95%, 90%, etc.), to turn on (e.g., to power) half of the length of the light bar 602 when the charge level of the battery pack 422 exceeds a second threshold (50%, etc.), and to turn on (e.g., to power) only a small portion (e.g., 10%) of the length of the light bar 602 when the charge level of the battery pack is below a third threshold (e.g., 10%, 5%, etc.). The various threshold may depend on the intended use or duration of use of the micro-mobility vehicle 400. For example, if the intended use from point A to point B includes steep inclines, the threshold may be higher such that the user does not run out of power during the ride. Conversely, if the intended use is a short strip from point C to point D that is mostly flat and downhill, the threshold may be lower. Other considerations include the weight of the user(s) and the weight of any package (such as grocery, backpack, etc.) the user(s) may have for the ride. The threshold may also depend on the type of battery pack 422 being used, e.g., a newer, more efficient battery pack may generally have a lower threshold, while an older, less efficient battery pack may generally have a higher threshold for the same type of use or trip.

FIG. 6B illustrates another embodiment of the light bar 602 implemented on the battery compartment 420. As shown, the light bar 602 is provided on a different exterior surface (or the entire circumference) of the battery compartment 420. Similarly, the battery compartment 420 may be configured to turn on (e.g., to power) at least a portion of the light bar 602 to indicate a charge level of the battery pack 422.

Figure 7:
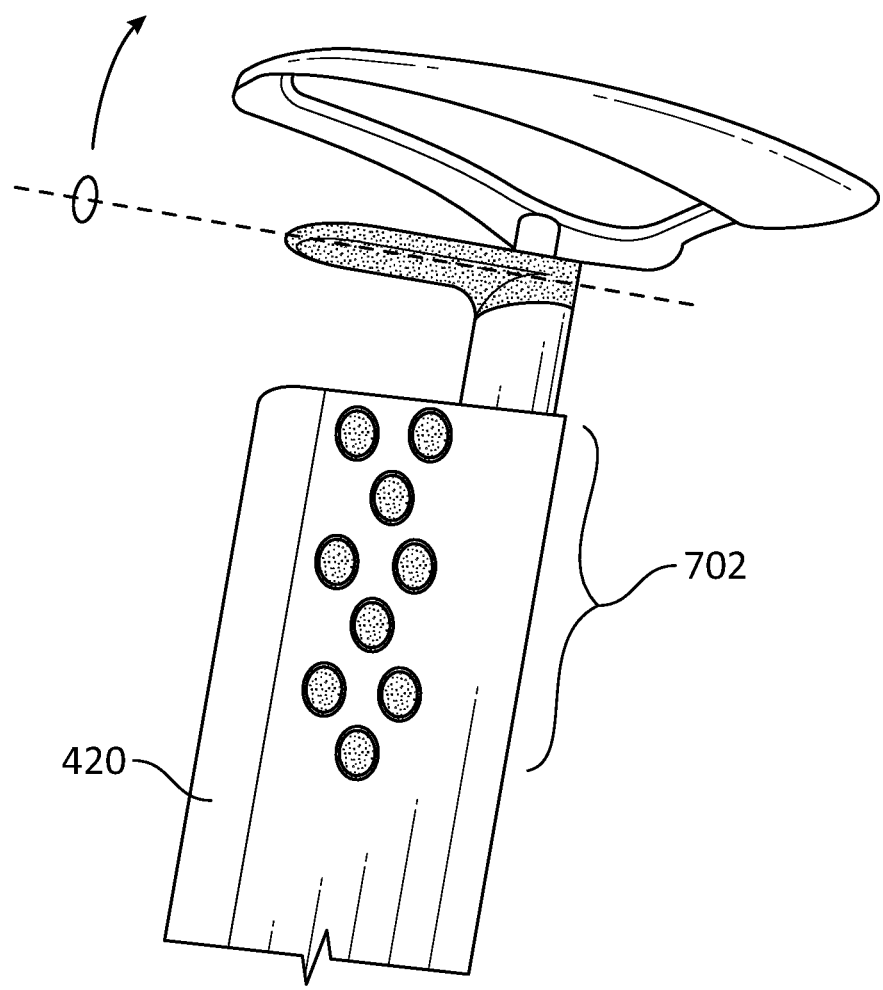
FIG. 7 illustrates another visual indicator implemented on a surface of the battery compartment in accordance with an embodiment of the disclosure.

FIG. 7 illustrates another example visual indicator that is implemented in the form of a series of lights 702. In such an embodiment, the battery compartment 420 may be configured to turn on (e.g., to power) at least a portion of the lights in the series of lights 702 to indicate a determined charge level of the battery pack 422. For example, the battery compartment 420 may turn on (e.g., to power) the entire series of lights 702 when the charge level of the battery pack 422 is above a first threshold (e.g., 95%, 98%, etc.), turn on (e.g., power) half of the lights in the series of lights 702 when the charge level of the battery pack 422 is above a second threshold (e.g., 50%), and turn on (e.g., power) only one of the series of lights 702 when the charge level of the battery pack is below a third threshold (e.g., 5%, 1%, etc.). As discussed above, the threshold at which the lights turn on may vary on different factors. While the visual indicator is shown to be implemented on the battery compartment 420 in FIGS. 6A-7, the same visual indicator can be implemented on the battery pack 422. For example, the light bar 602 and/or the series of lights 702 may be implemented on the protruding portion 508 of the battery pack 422 so that it is visible to users when the battery pack 422 is secured within the battery compartment 420.

The visual indicator may be triggered automatically (e.g., presented all the time, presented periodically such as every 5 seconds, etc.), or may be triggered in response to a signal (initiated by the user or by the micro-mobility vehicle 400). For example, the battery pack and/or the battery compartment may have a button, that when pressed, would trigger the visual indicator to indicate a charge level of the battery pack inside the battery compartment. The indicator enables users (e.g., riders of the micro-mobility vehicle 400, maintenance workers of the micro-mobility vehicle 400, etc.) to quickly determine a charge level of the battery pack 422 connected to the micro-mobility vehicle 400, such that they can determine whether there is a need to replace and/or charge the battery pack 422 for the micro-mobility vehicle 400. For example, a user who desires to hire the micro-mobility vehicle 400 may quickly determine the charge level of the battery pack 422 connected to the micro-mobility vehicle 400 based on the visual and/or audio indicator. The user may then decide whether the micro-mobility vehicle 400 has sufficient charge to transport the user to the intended destination. The trigger may be initiated by the micro-mobility vehicle 400 as well, such as when a sensor detects a need for maintenance, such as the power level of the battery pack 422 dropping below a certain threshold (as discussed above) or other electrical, mechanical, or maintenance issue that requires attention, including a scheduled maintenance coming due soon (either based on distance traveled or time elapsed from last maintenance), a malfunction of the battery (such as conveyed through an error code), and the like.

In another example, the micro-mobility vehicle 400 may belong to a fleet of similar micro-mobility vehicles. Batches of the micro-mobility vehicles may be located at different stations within a geographical area. The fleet of micro-mobility vehicles may be communicatively coupled with each other and with the management system 240 via one or more networks (e.g., the mesh network 260, the WAN 250, etc.). When the charge level of the battery pack 422 of the micro-mobility vehicle 400 is below a threshold (e.g., 10%, 5%, etc.), the micro-mobility vehicle 400 may be configured to transmit a signal to the management system 240. The signal may include a current location of the micro-mobility vehicle 400 (obtained from the GNSS 118) and an identifier associated with the micro-mobility vehicle 400. The management system 240 may dispatch a maintenance worker to service the micro-mobility vehicle 400 based on the low charge level signal. Since multiple micro-mobility vehicles may be located at location indicated in the signal (e.g., a micro-mobility vehicle station), the maintenance worker may use the visual indicator and/or the audio indicator to determine which of the micro-mobility vehicles have low battery charge levels, and may proceed to charge and/or replace the battery for the micro-mobility vehicles that have low battery charge levels.

In addition to the visual indicator for indicating a charge level of the battery pack, the battery pack 422 and/or the battery compartment 420 may also provide additional lighting (e.g., a light strip, a light bulb, etc.) to improve safety while riding at night.

Figure 8A:
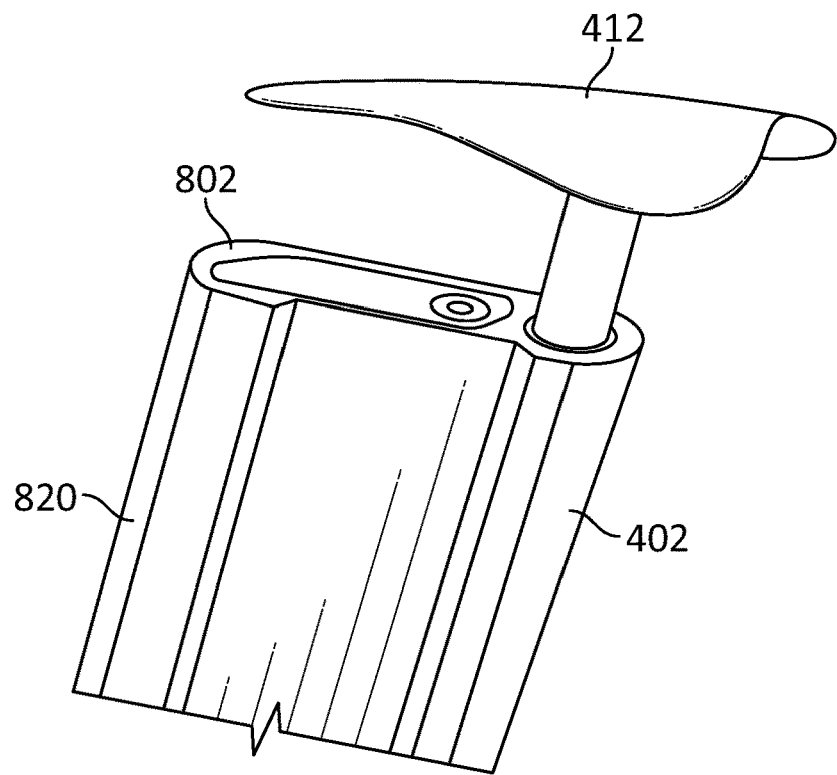
FIGS. 8A and 8B illustrate another battery compartment implementation that is integrated within a micro-mobility vehicle in accordance with an embodiment of the disclosure.
Figure 8B:
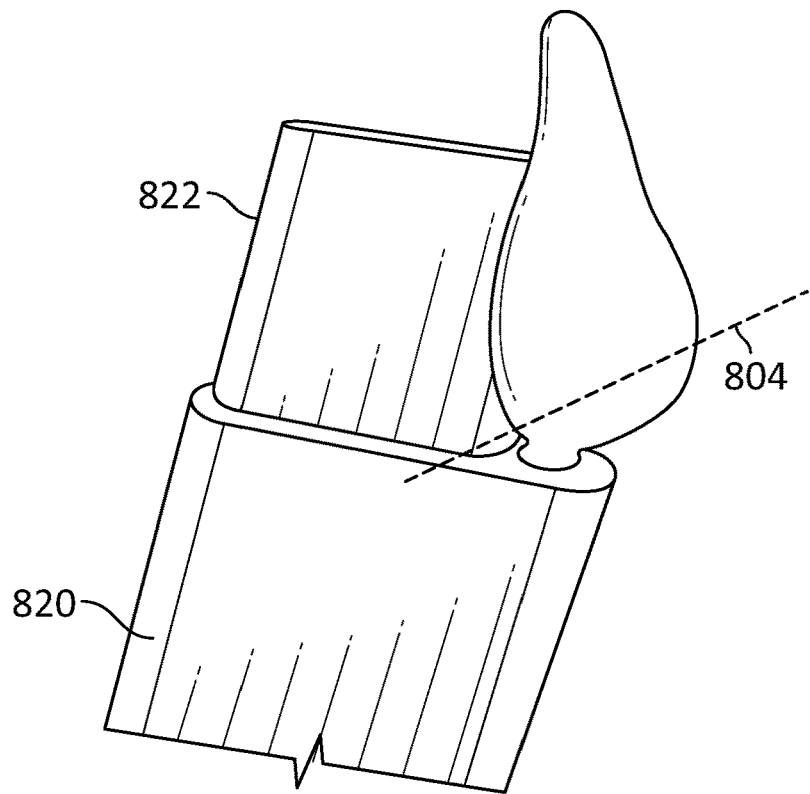

FIGS. 4A-5B illustrate a battery compartment 420 that is distinct from, but affixed to, the seat tube 402. In some embodiments, the battery compartment may be implemented differently. For example, the battery compartment may be incorporated into (as a part of) the seat tube of a micro-mobility vehicle according to some embodiments of the disclosure. FIGS. 8A and 8B illustrate an example implementation of the battery compartment that is incorporated into the seat tube. As shown in FIG. 8A, a battery compartment 820 is part of the seat tube structure 402 (and is part of the frame of the micro-mobility vehicle 400). Furthermore, as shown in FIG. 8A, the battery compartment 820 is implemented on the front side of the seat tube 402 (e.g., the side that is closer to the handle bar). Similar to the battery compartment 420, the battery compartment 820 also includes an opening 802 for inserting and/or removing a battery pack. By implementing the battery compartment 820 on the front side of the seat tube 402, the opening 802 may be at least partially obstructed by the saddle 412. As such, the saddle 412 is constructed to enable an adjustment of its orientation. As shown in FIG. 8B, the saddle 412 can be tilted along the invisible axis 804 to provide users access to the opening 802 of the battery compartment 820, such that a battery pack, such as the battery pack 822 can be inserted into and/or removed from the battery compartment 820 by sliding the battery pack 822 through the opening 802 into and/or out of the battery compartment 820 in a direction that is parallel to the seat tube 402.

Figure 9A:
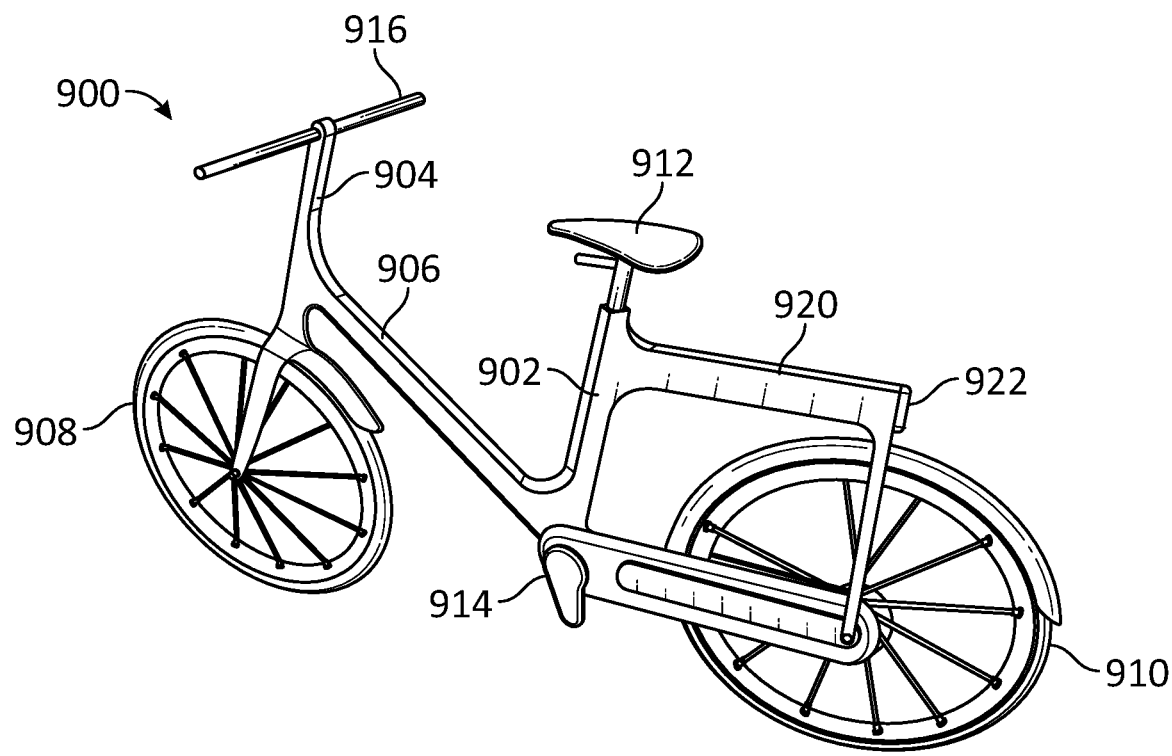
FIGS. 9A and 9B are perspective views of another micro-mobility vehicle in accordance with an embodiment of the disclosure.
Figure 9B:
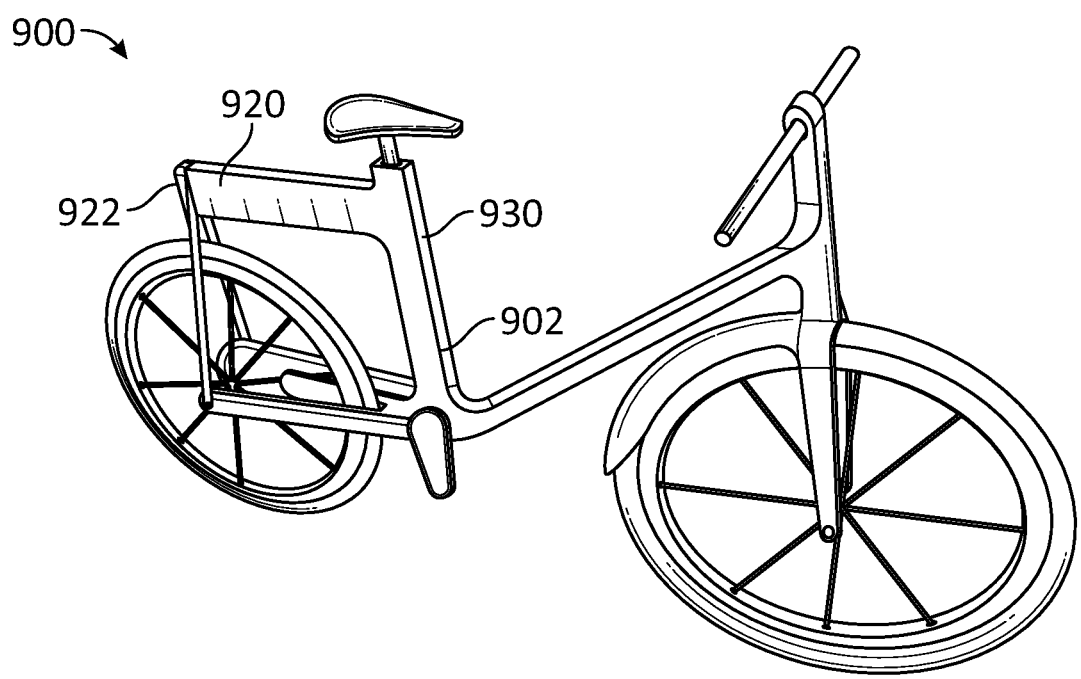

Instead of aligning the battery compartment parallel to the seat tube, a battery compartment of some embodiments can be extended away from (out of) the seat tube. FIGS. 9A and 9B are perspective views of a micro-mobility vehicle 900 having a battery compartment that extends away from a seat tube. As shown in FIG. 9A, the micro-mobility vehicle 900 is an electric bicycle similar to the micro-mobility vehicle 400. The micro-mobility vehicle 900 has a frame comprising at least a seat tube 902 for supporting a saddle 912, a head tube 904 for supporting a handle bar 916, and a down tube 906 connecting the seat tube 902 and the head tube 904. The micro-mobility vehicle 900 may also include a front wheel 908, a rear wheel 910, and a propulsion system 914 for mobilizing the micro-mobility vehicle 900 (e.g., motorizing the rear wheel 910).

Similar to the micro-mobility vehicle 400, the micro-mobility vehicle 900, also includes a battery compartment 920 that is physically connected to the seat tube 902 and for receiving a battery pack, such as battery pack 922. However, unlike the micro-mobility vehicle 400, the battery compartment 920 of the micro-mobility vehicle 900 is not parallel to the seat tube 902, but rather, extends away from the seat tube 902. In some embodiments, the battery compartment 920 extends away from the seat tube 902 in a rear facing direction of the micro-mobility vehicle 900 (e.g., extends away from the handle bar 916), such that a portion of the battery compartment 920 is on top of the rear wheel 910. In some embodiments, the battery compartment 920 may be implemented to be substantially perpendicular (e.g., within a threshold deviation such as 5%, 10%, etc.) to the seat tube 902. In other words, the battery compartment 920 may be implemented to be substantially parallel (e.g., within a threshold deviation such as 5%, 10%, etc.) of the ground with the micro-mobility vehicle 900 is in operating position and orientation (e.g., when the micro-mobility vehicle 900 is upright).

In some embodiments, the micro-mobility vehicle 900 may include an electrical connector 930, for example, disposed a junction of the seat tube 902 and the battery compartment 920, as shown in FIG. 9B. The electrical connector 930 may be configured to transfer electrical power from the battery pack 922 to the propulsion system 914.

Wiring may be provided to connect the electrical connector 930 to the propulsion system 914.

Figure 10A:
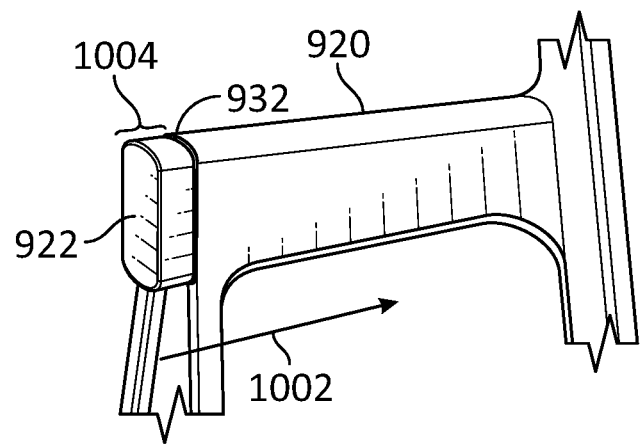
FIGS. 10A and 10B illustrate yet another battery compartment implementation that is integrated within a micro-mobility vehicle in accordance with an embodiment of the disclosure.
Figure 10B:
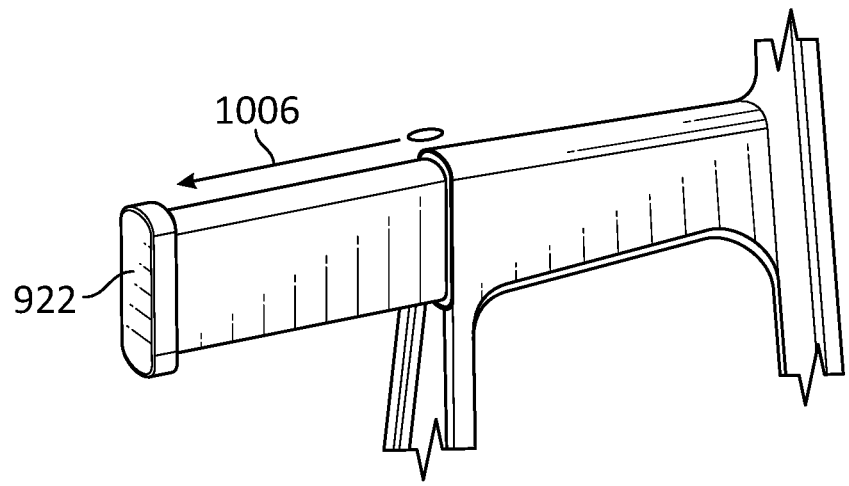

Similar to the battery compartment 420, the battery compartment 920 may also include an opening for a battery pack to be inserted into and/or removed from the battery compartment 920. As shown in FIG. 10A, the battery compartment 920 may include an opening 932 at an end (the rear facing end) of the battery compartment 920. The battery pack 922 may be inserted into the battery compartment 920 by sliding the battery pack 922 through the opening 932 into the battery compartment 920 in a direction that is substantially parallel (e.g., within a threshold deviation such as 5%, 10%, etc.) to the length of the battery compartment 920 (as shown by the arrow 1002).

As shown in FIG. 10A, after the battery pack 922 is secured within the battery compartment 920, a portion 1004 of the battery pack 922 (which includes one end of the battery pack 922) may still be protruding out of the battery compartment 920 from the opening 902. In other words, the portion 1004 of the battery pack 922 is uncovered by the battery compartment 920 after the battery pack 922 is secured within the battery compartment 920. Allowing the portion 1004 to be exposed from the battery compartment 920 enables the battery pack 922 to be removed from the battery compartment 420 more easily. For example, a user may grab the portion 1004 of the battery pack 922 and pull in a direction substantially parallel (e.g., within a threshold deviation such as 5%, 10%, etc.) to the length of the battery compartment 920 (as shown by the arrow 1006). Furthermore, an indicator (e.g., a visual indicator, etc.) for indicating a charge level of the battery pack 922 may be implemented on any exterior surface of the battery compartment 920 and/or the protruding portion 1004 of the battery pack 922 using techniques disclosed herein. In such embodiments described herein where at least a portion of the battery pack is exposed, e.g., extends past an opening of the battery compartment, a locking mechanism may be employed to prevent the battery pack from being stolen or possibly falling out. An example of suitable locking mechanism may include a physical engagement that enables the battery pack to slide in, but not out, unless a key or other unlocking mechanism is used to disengage the physical engagement. Other types are also contemplated in which a component can be secured through an open end of a component once inserted. A benefit of implementing the battery compartment in the manner shown in FIGS. 9A-10B is that additional modular accessories (e.g., a basket, a child seat, a ricksaw assembly, etc.) may be added to the micro-mobility vehicle 900 using the structure provided by the battery compartment 920, which will be described in more details below.

Figure 11A:
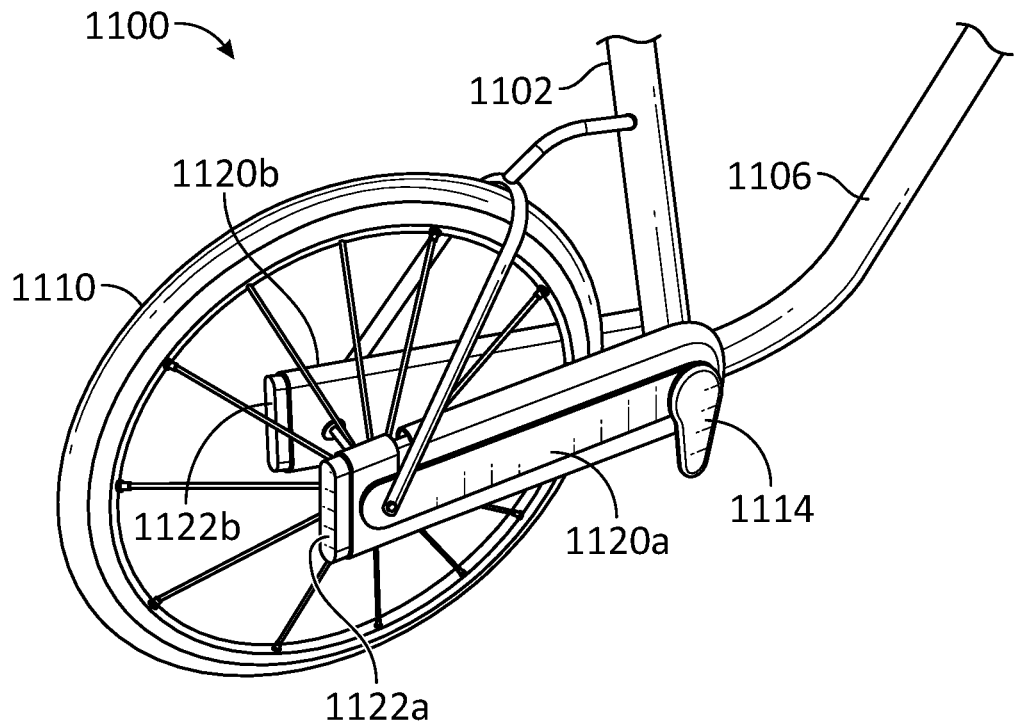
FIGS. 11A and 11B illustrate yet another battery compartment implementation that is integrated within a micro-mobility vehicle in accordance with an embodiment of the disclosure.
Figure 11B:
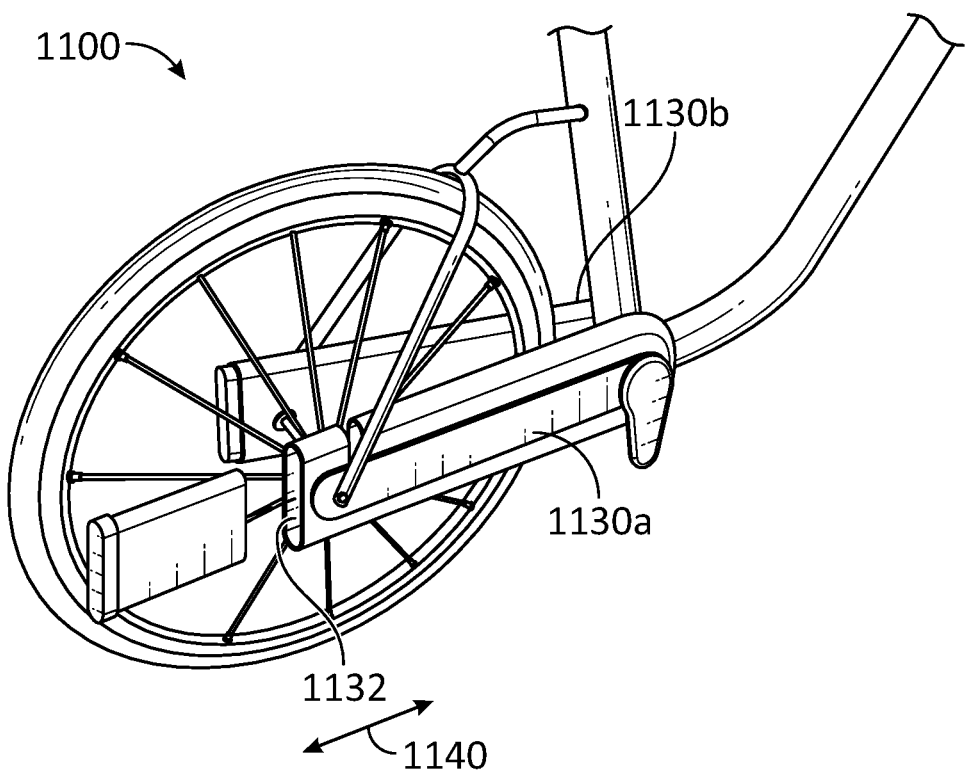

FIGS. 11A and 11B illustrate another implementation of battery compartments in a micro-mobility vehicle 1110. As shown in FIG. 11A, two battery compartments 1120a and 1120b are incorporated into the micro-mobility vehicle 1110. The two battery compartments 1120a and 1120b are physically coupled to the seat tube 1102 (near the end of the down tube 1106) and extends away from the seat tube 1102. Specifically, each of the battery compartments 1120a and 1120b is located on either side of the rear wheel 1110 and is configured to receive and secure battery packs 1122a and 1122b, respectively, to the micro-mobility vehicle 1110. In some embodiments, the battery compartments 1120a and 1120b mimics a shape and location of a chain box of a bicycle. Two electrical connectors 1130a and 1130b may be disposed on the two battery compartments 1120a and 1120b, respectively for transferring electrical power from the battery packs 1122a and 1122b to the propulsion system 1114.

The battery packs 1122a and 1122b can be inserted into and/or removed from the battery compartment 1120a and 1120b by sliding the battery packs 1122a and 1122b through the openings (e.g., the opening 1132) of the battery compartments 1120a and 1120b in a direction that is substantially parallel (e.g., within a deviation threshold such as 5%, 10%, etc.) of the length of the battery compartment 1120a and 1120b (as shown by the arrow 1140).

Figure 12A:
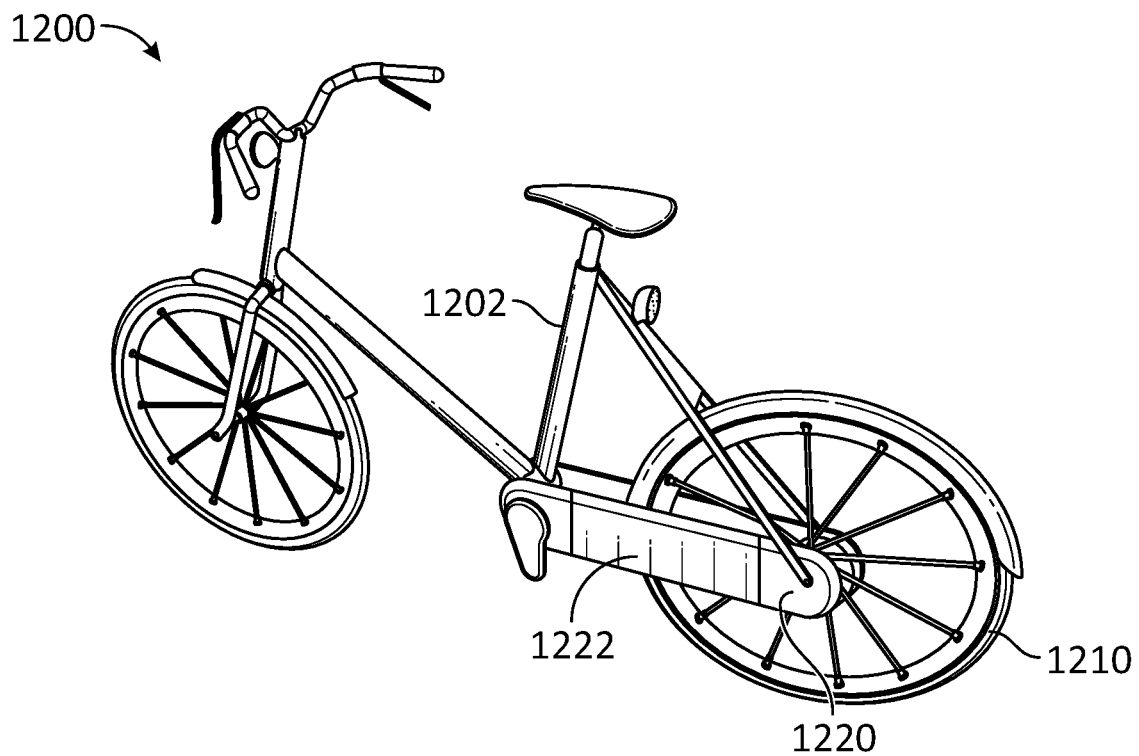
FIGS. 12A and 12B illustrate yet another battery compartment implementation that is integrated within a micro-mobility vehicle in accordance with an embodiment of the disclosure.
Figure 12B:
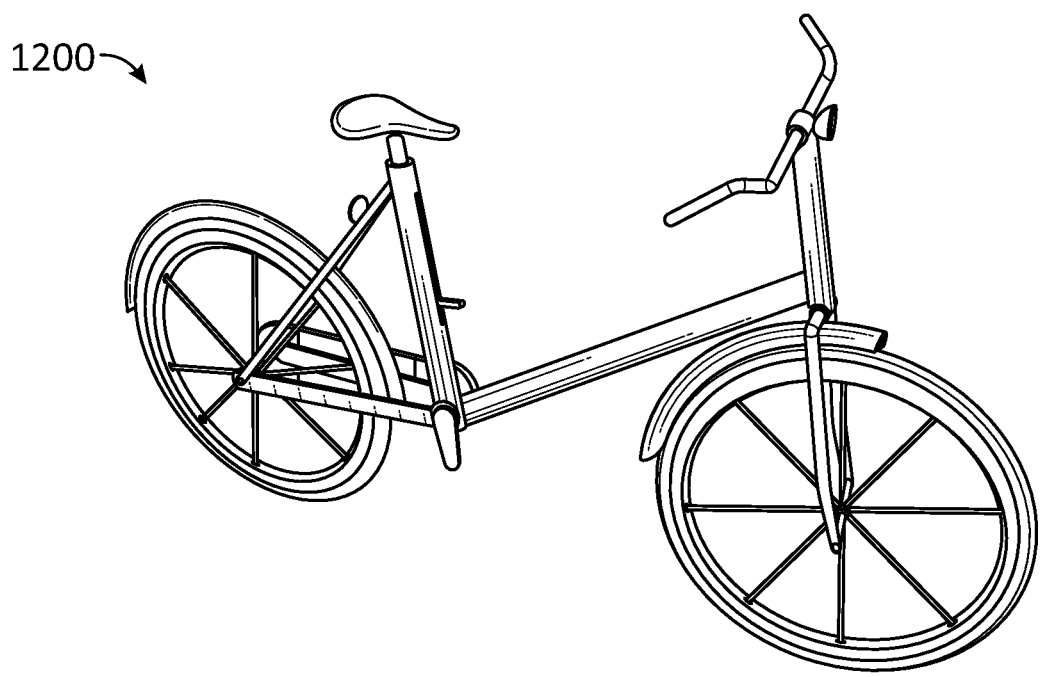
Figure 13A:
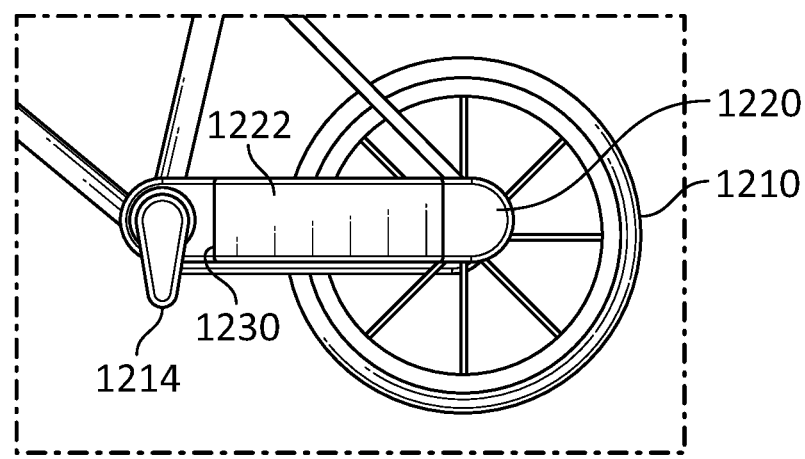
FIGS. 13A and 13B illustrate an alternative mechanism for fitting a battery pack into a battery compartment in accordance with an embodiment of the disclosure.

FIGS. 12A and 12B illustrates another implementation of a battery compartment 1220 within a micro-mobility vehicle 1200. As shown in FIG. 12A, the battery compartment 1220 is similar to the battery compartment 1120a or 1120b, where the battery compartment 1220 is physically coupled to the seat tube 1202 and extends away from the seat tube 1202 to a side of a rear wheel 1210. However, unlike the battery compartment 1120a or 1120b, the battery compartment 1220 exposes a majority portion (e.g., more than half, more than 80%, etc.) of the battery pack 1222. FIG. 13A illustrates the battery pack 1222 that is secured within the battery compartment 1220. An electrical connector 1230 may be implemented at an end of the battery compartment 1220 that is closer to the propulsion system 1214 of the micro-mobility vehicle 1200.

Figure 13B:
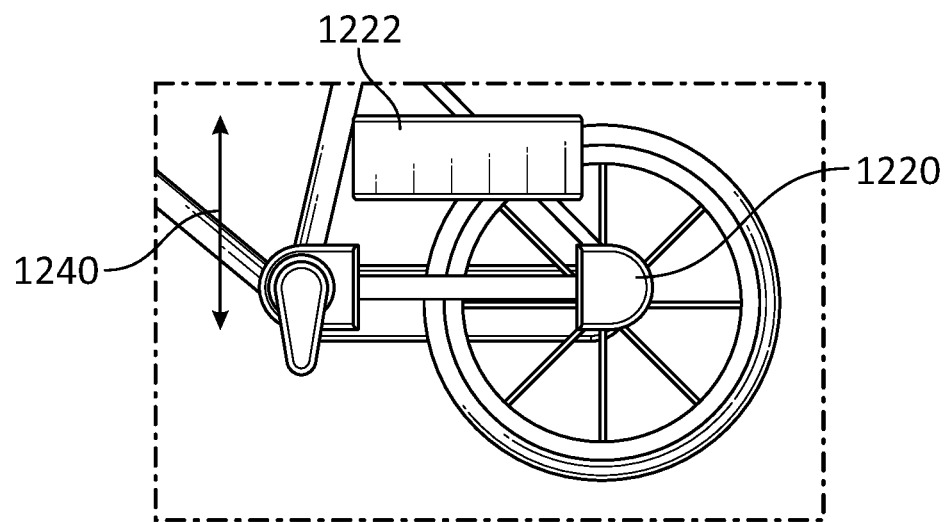
Figure 14A:
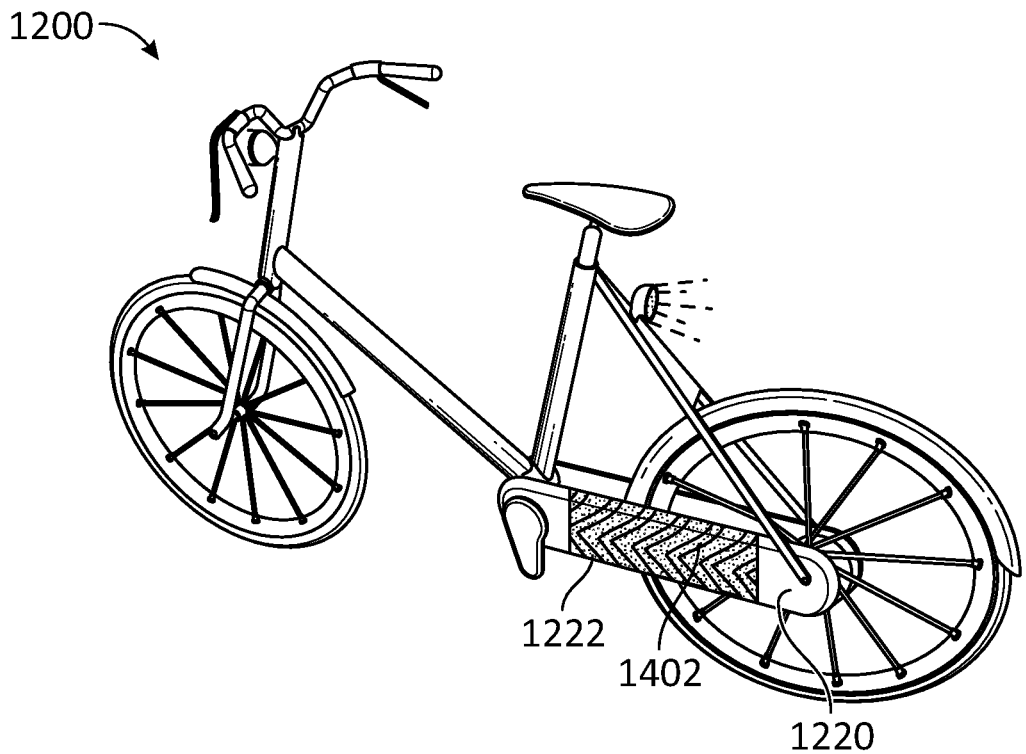
FIGS. 14A and 14B illustrate visual indicators implemented on a surface of the battery pack in accordance with an embodiment of the disclosure.

Furthermore, the battery pack 1222 may be inserted into and/or removed from the battery compartments 1220 by sliding the battery pack 1122 in a direction that is substantially perpendicular (e.g., within a deviation threshold such as 5%, 10%, etc.) to the length of the battery compartment 1220 (as shown by the arrow 1240 of FIG. 13B). While only one battery compartment is shown in the FIGS. 12A and 12B, another battery compartment similar to the battery compartment 1220 may be implemented in the micro-mobility vehicle 1200 at a similar location as the battery compartment 1220 but on the opposite of the rear wheel 1210. The benefit of having a majority portion of the battery pack 1222 exposed (e.g., visible to users when the battery pack 1222 is secured within the battery compartment 1220) is that a larger surface area of the battery pack 1222 may be used to implement the visual indicator. As shown in FIG. 14A, a light bar 1402 is implemented on almost the entire exposed surface area of the battery pack 1222, which may be used to provide an indication of a charge level of the battery pack 1222 or for safety during nighttime riding. Further, the light bar 1402 may be configured with different lighting arrangements to provide additional control of lighting based on needs. For example, if sensors detect (or the management system detects) an approaching vehicle within a certain distance or closing rate, the light bar 1402 may flash bright red lights at a high frequency. Thus, depending on detected conditions, the light bar 1402 may emit different types, intensities, colors, and frequencies of light. Instead of or in addition the light bar 1402, reflective material may be used to increase safety and visibility issues.

Figure 14B:
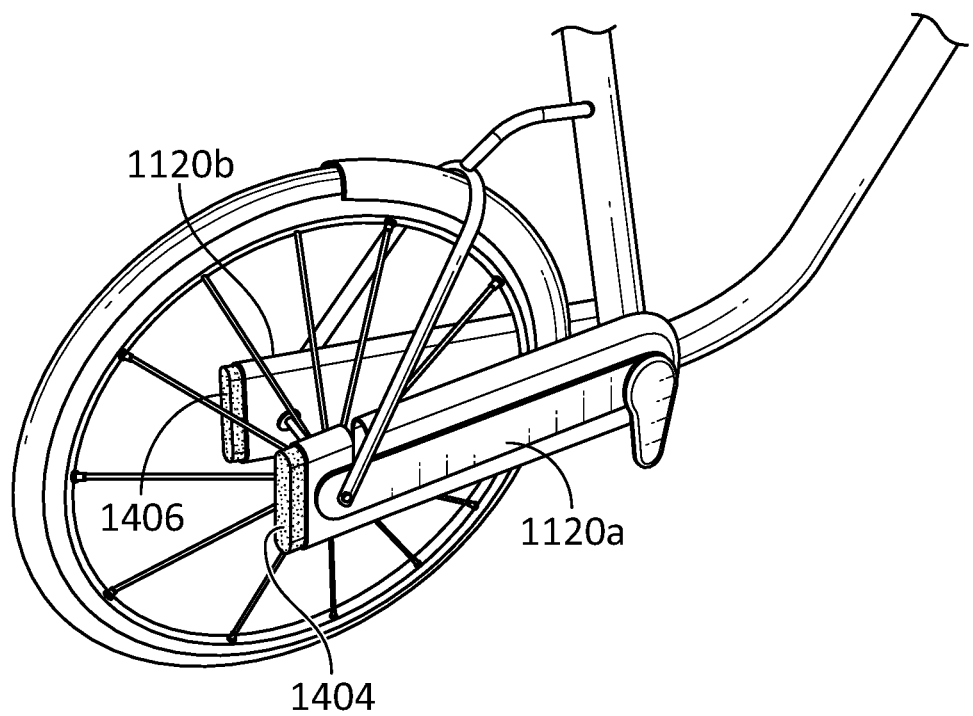

FIG. 14B illustrates light bars 1404 and 1406 implemented on the protruding portion of the battery packs 1122a and 1122b, which can be used for providing an indication of a charge levels of the battery packs 1122a and 1122b or for safety during nighttime riding.

Figure 15:
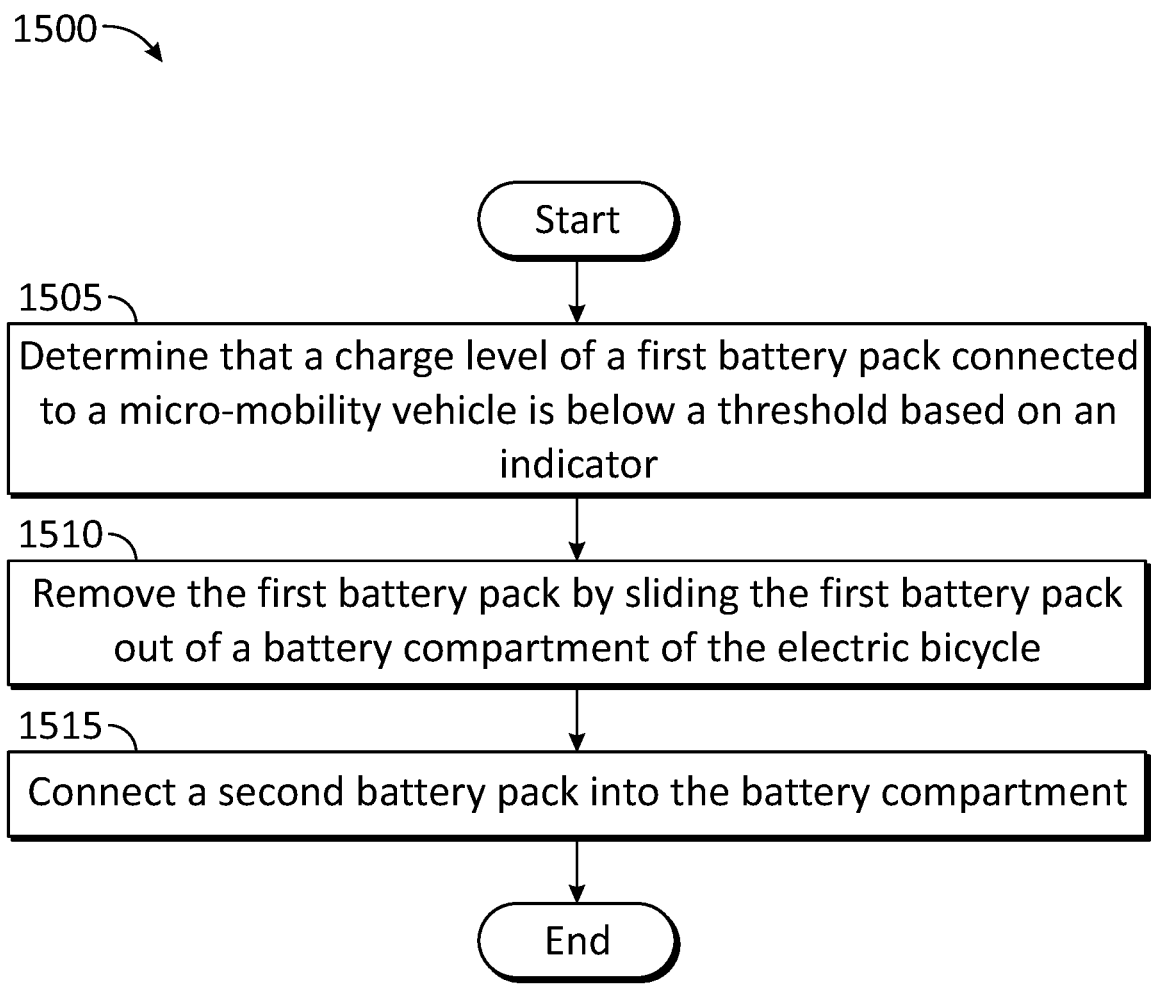
FIG. 15 illustrates a flow diagram of a process to replace a battery pack on a micro-mobility vehicle in accordance with an embodiment of the disclosure.

FIG. 15 illustrates a process 1500 for servicing a micro-mobility vehicle according to one embodiment of the disclosure. The process 1500 begins by determining (at step 1505) that a charge level of a first battery pack connected to a micro mobility vehicle is below a threshold based on an indicator. For example, a user who desires to hire a micro-mobility vehicle may use the dynamic transportation matching system 200 to find a matched micro-mobility vehicle. In some embodiments, based on a current location of the user, the dynamic transportation matching system 200 may locate a micro-mobility vehicle that is available for hire and is closest to the user. The dynamic transportation matching system 200 may also provide directions to the micro-mobility vehicle from the current location of the user. The location may be a micro-mobility vehicle station where one or more micro-mobility vehicles may be stored. When the user arrives at the location, the user may quickly determine the charge level of the battery pack connected to the micro-mobility vehicle based on the visual and/or audio indicator presented on the battery pack and/or the battery compartment of the micro-mobility vehicle. The user may determine that the battery pack needs to be replaced based on the indicator indicating that the charge level of the battery pack is below a threshold (e.g., 5%, 10%, etc.).

In another example, as the user is using the micro-mobility vehicle, the user may, from time to time, determines whether the battery pack of the micro-mobility vehicle still has sufficient charge (e.g., above a threshold) based on the indicator presented on the battery pack and/or the battery compartment. The user may then determine that the battery pack needs to be replaced based on the indicator indicating that the charge level of the battery pack is below a threshold (e.g., 5%, 10%, etc.).

In yet another example, the management system 240 may receive a signal from a micro-mobility vehicle indicating a low charge level of the battery. The signal may include a location of the micro-mobility vehicle. Thus, the management system 204 may dispatch a maintenance worker to service the micro-mobility vehicle.

The process 1500 then removes (at step 1510) the first battery pack by sliding the first battery pack out of a battery compartment of the electric bicycle and connects (at step 1515) a second battery pack into the battery compartment. For example, the user or the maintenance worker may slide the battery pack of the micro-mobility vehicle out of the battery compartment and slide a different battery pack into the battery compartment using the techniques described herein.

In some embodiments, the battery compartment (e.g., the battery compartments 420, 820, 920, 1120a, 1120b, and 1220) may be configured to receive and secure different types of battery packs. For example, battery packs of different sizes may fit into the same battery compartment. In one non-limiting example, battery packs of different lengths may be inserted into the battery compartment to power the micro-mobility vehicle. A longer battery pack may have a larger portion of the battery pack protruding from the opening of the battery compartment where a shorter battery pack may have a smaller portion of the battery pack protruding from the opening of the battery compartment. Having a battery compartment that can secure battery packs of different sizes enables the micro-mobility vehicle to be configured with different power capacity by simply changing the battery packs without modifying any structural elements of the micro-mobility vehicle. For example, a smaller (e.g., lighter weight) battery pack may be connected to the micro-mobility vehicle by default, as the lighter weight, smaller battery pack provides a quicker ride and is more power efficient. However, when a rider desires to use the micro-mobility vehicle for a ride that requires more power (such as a longer distance ride, a ride with lots of hills, and/or a ride with lots of starts and stops), a user (e.g., the rider, a maintenance worker, etc.) can easily transform the micro-mobility vehicle to have greater power capacity by swapping the current battery pack with a more efficient or higher power capacity battery pack. The user may remove the current battery pack by sliding the battery pack out of the battery compartment through the opening (in a direction substantially parallel to the length of the battery compartment) and by inserting the replacement battery pack by sliding the battery pack into the battery compartment through the opening (in a direction substantially parallel to the length of the battery compartment). The opposite applies as well, where the current battery pack is a heavy battery pack, but the next ride is anticipated to be a short and/or mostly flat and downhill ride that can be finished from start to end with a lighter weight battery pack.

In addition to the battery packs, other modular accessories may also be provided to transform a micro-mobility vehicle to different configurations. For example, one or more package hauling assemblies, such as a basket, a ricksaw assembly, a saddlebag frame, and the may be added to the micro-mobility vehicle to transform the micro-mobility vehicle into a package carrier micro-mobility vehicle. In another example, a baby seat assembly may be added to the micro-mobility vehicle to transform the micro-mobility vehicle into a baby carrying micro-mobility vehicle.

Figure 16A:
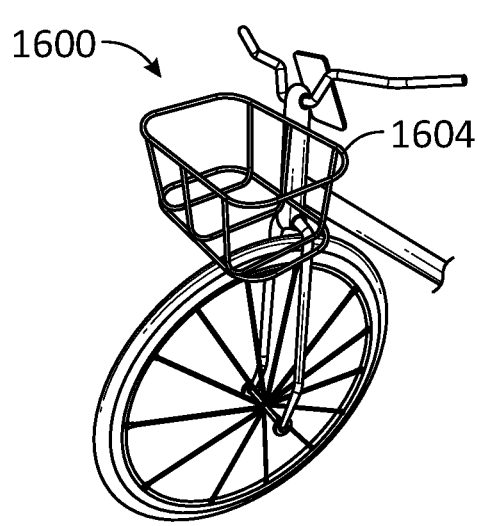
FIGS. 16A-16F illustrate various basket assemblies that can be attached to a micro-mobility vehicle in accordance with various embodiments of the disclosure.
Figure 16B:
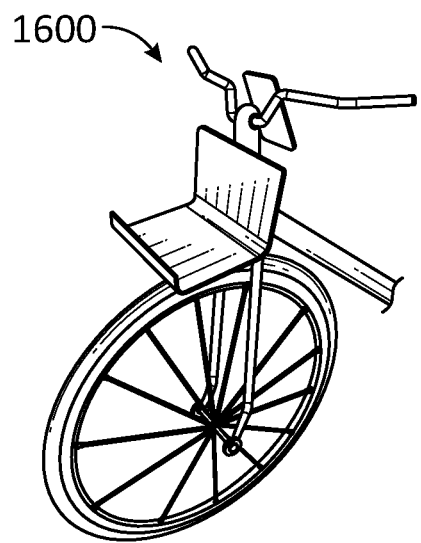
Figure 16C:
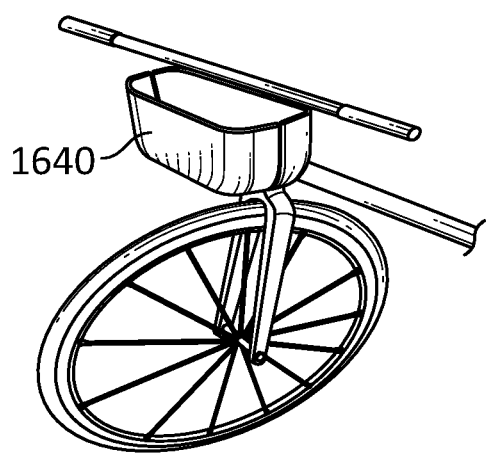
Figure 16D:
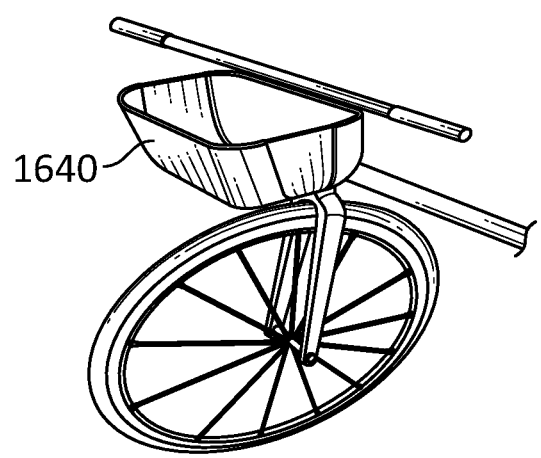
Figure 16E:
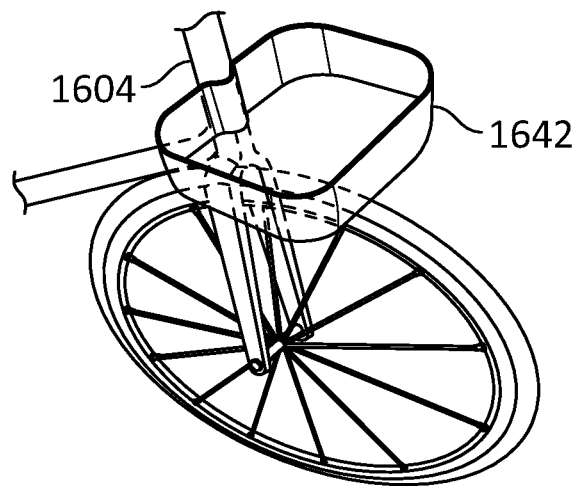
Figure 16F:
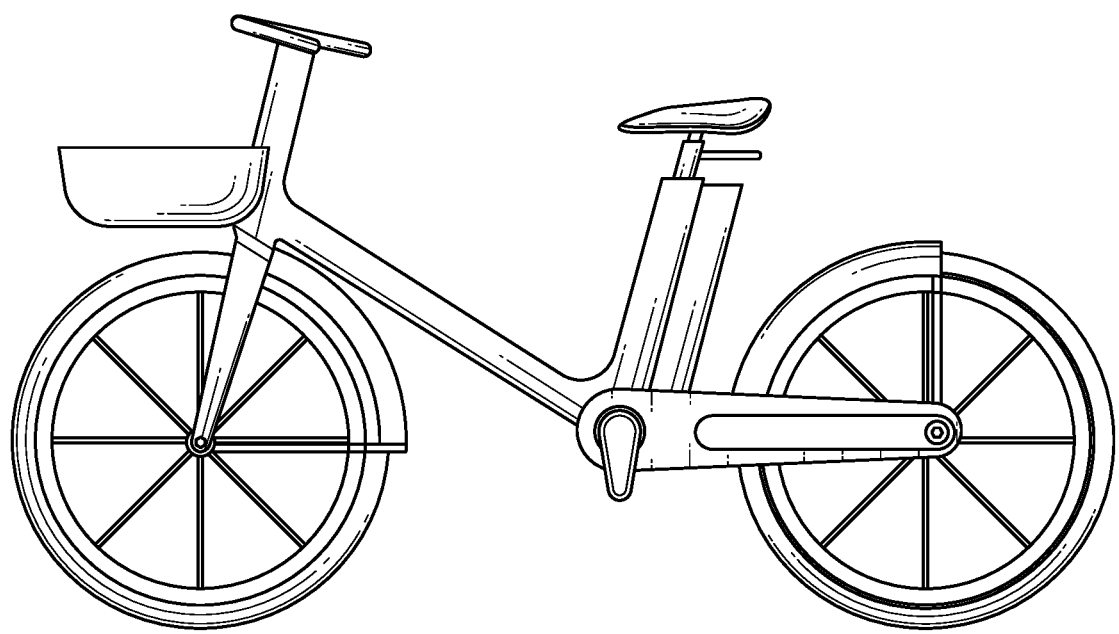
Figure 17A:
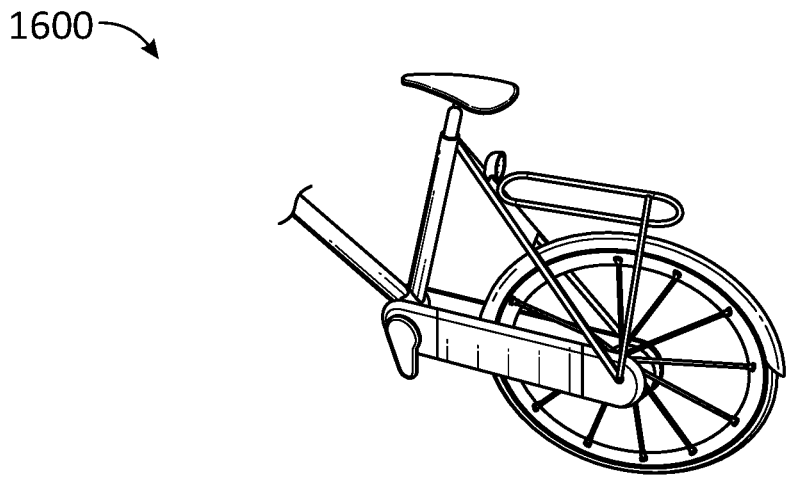
FIGS. 17A-19B illustrate various package carrier assemblies that can be attached to a micro-mobility vehicle in accordance with various embodiments of the disclosure.
Figure 17B:
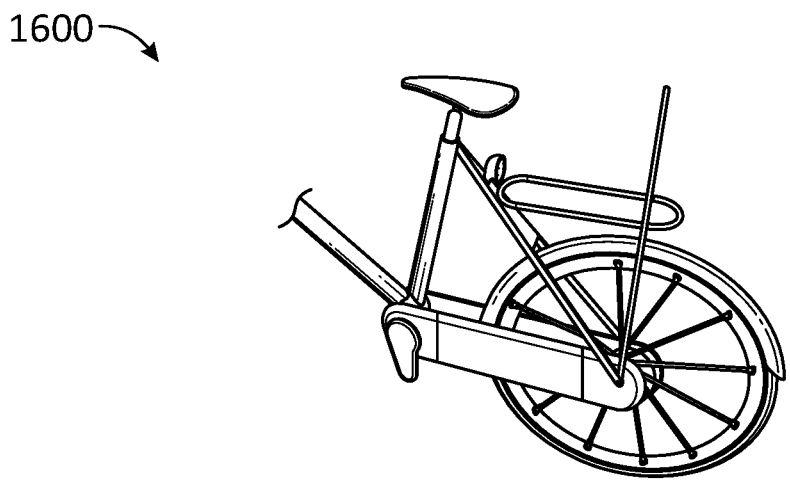
Figure 17C:
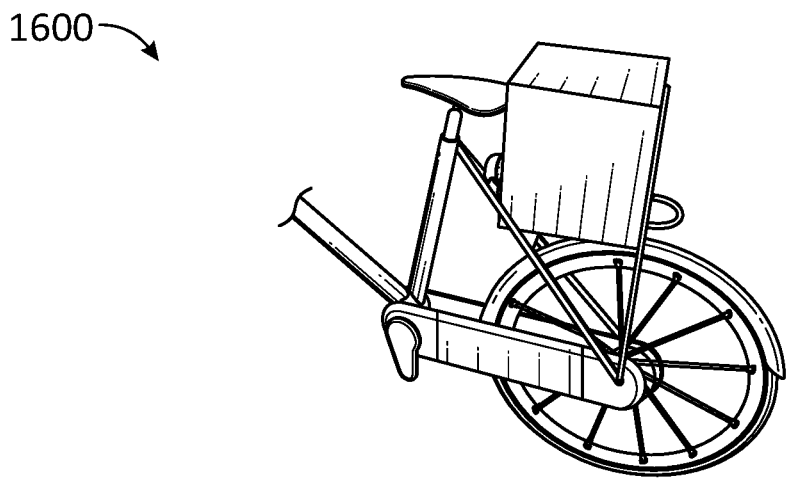
Figure 18A:
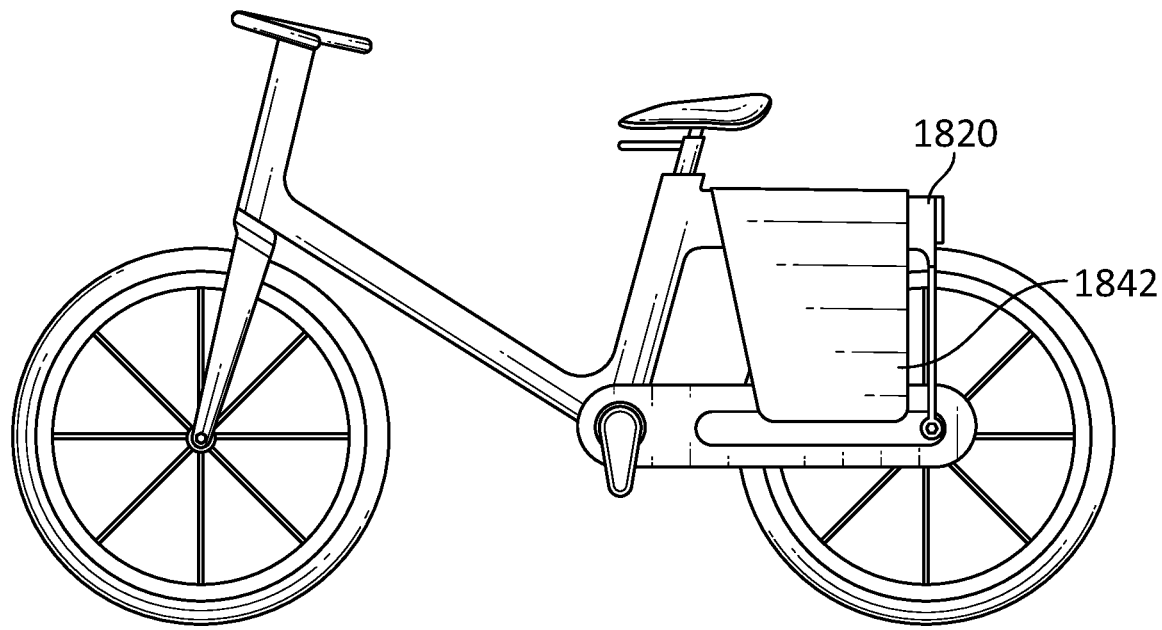
Figure 18B:
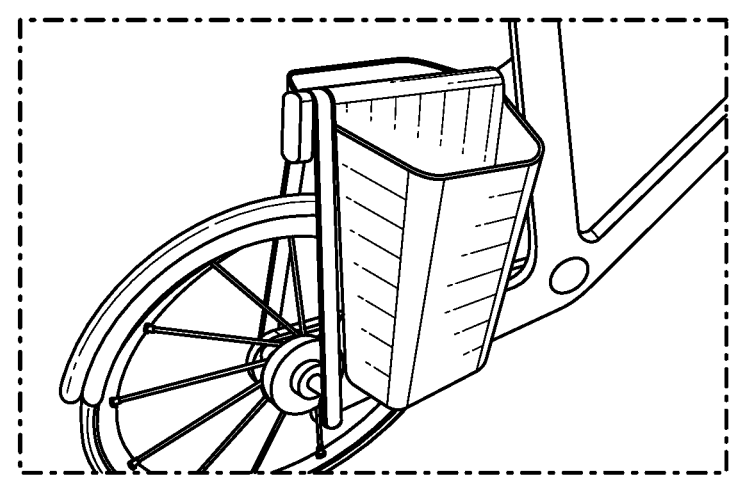
Figure 19A:
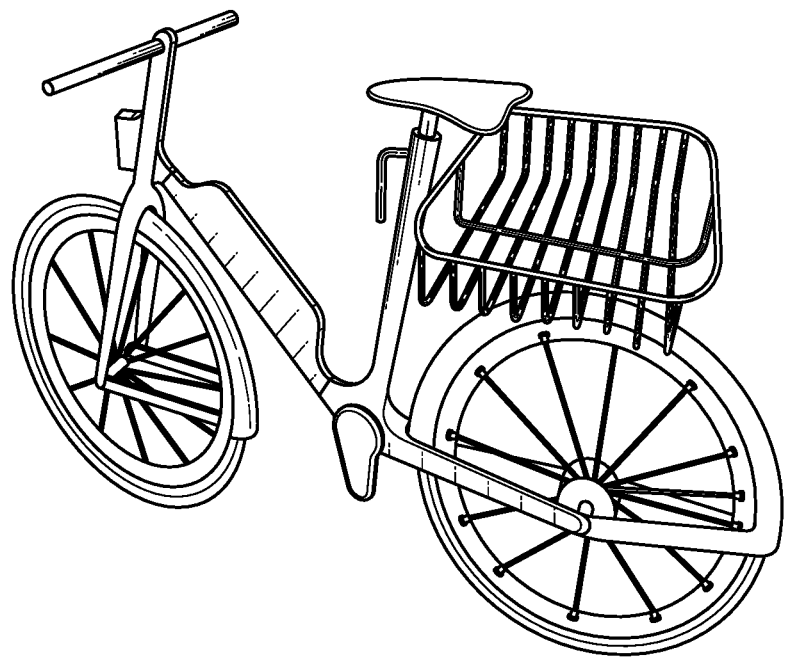
Figure 19B:
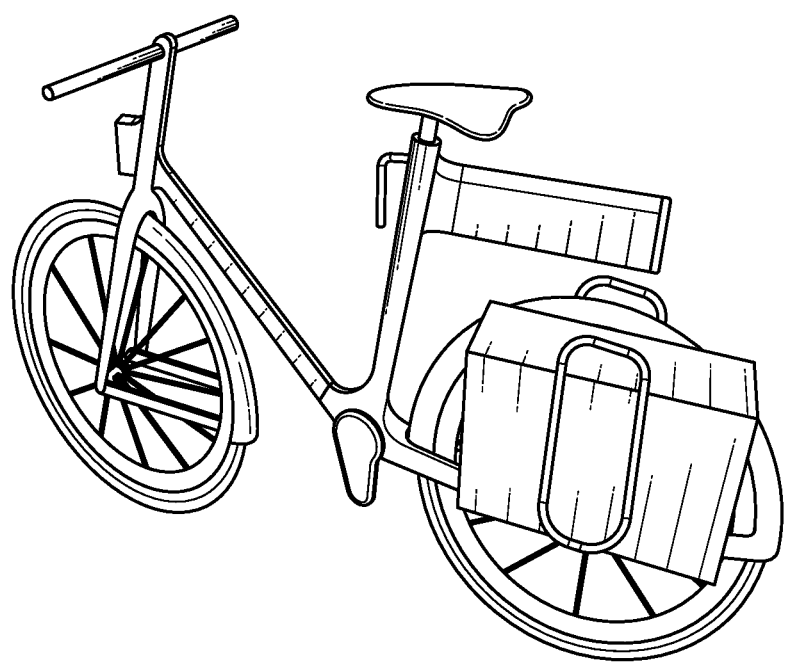

FIGS. 16A-16F illustrates different types of modular package carrier assembly (e.g., baskets) that can be added to a micro-mobility vehicle 1600 by attaching the package carrier assembly to the head tube 1604 of the micro-mobility vehicle 1600. In particular, FIG. 16C illustrates a basket 1640 that may be made of a mix of rigid and soft elastic elements such that the basket 1640 is expandable. FIG. 16D illustrates the same basket 1640 in an expanded configuration. FIG. 16E illustrates a clear basket 1642 (that may be made of transparent or semi-transparent plastic materials) that can be used as a light diffuser. For example, a light source (e.g., a LED light) may be placed between the basket 1642 and the head tube 1604. By providing a light source to the clear basket 1642, the entire clear basket 1642 may be lit to provide a larger lit area, which improves safety during nighttime riding. Reflective coating or tape may also be used to increase visibility of the micro-mobility vehicle 1600 at night.

FIGS. 17A-19B illustrate different package carrier assemblies that can be attached to the structure of a micro-mobility vehicle. In particular, FIGS. 18A and 18B illustrate the battery compartment structure 1820 (similar to the battery compartment 920) can be used to provide support for a saddlebag frame 1842. The baskets illustrated in FIGS. 16a-16F and the other package carrier assemblies illustrated in FIGS. 17a-19B may be attached to the micro-mobility vehicle 1600 easily and within a short amount of time (e.g., within 10 seconds, within a minute, etc.), such as with molded parts that include a male component and a female component, molded "snap in" features, and quick release/engagement mechanisms. Thus, a user (e.g., a rider, a maintenance worker, etc.) may transform any micro-mobility vehicle into a specialized micro-mobility vehicle (e.g., a package hauling micro-mobility vehicle) quickly and easily.

Figure 20A:
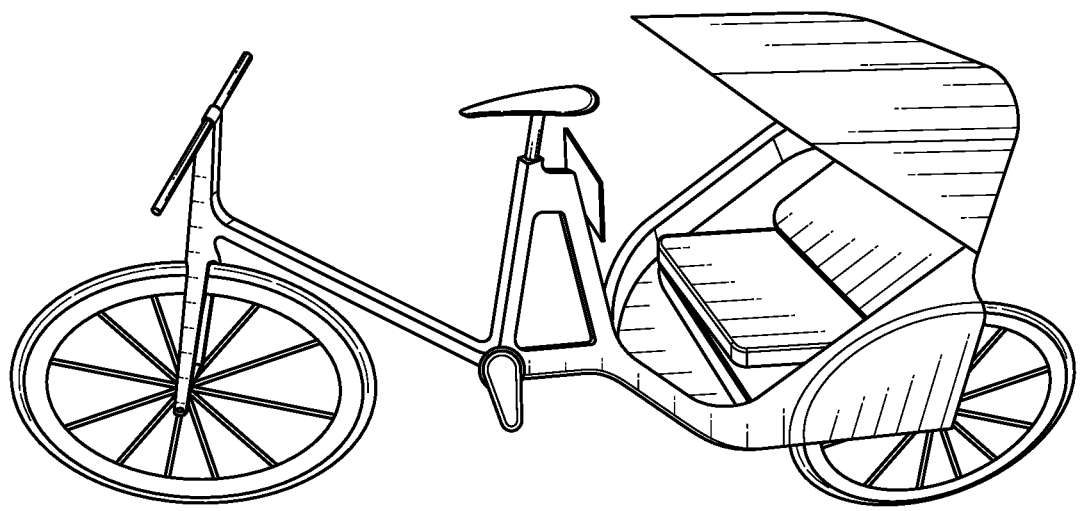
FIGS. 20A-20C illustrate various child seat assemblies that can be attached to a micro-mobility vehicle in accordance with various embodiments of the disclosure.
Figure 20B:
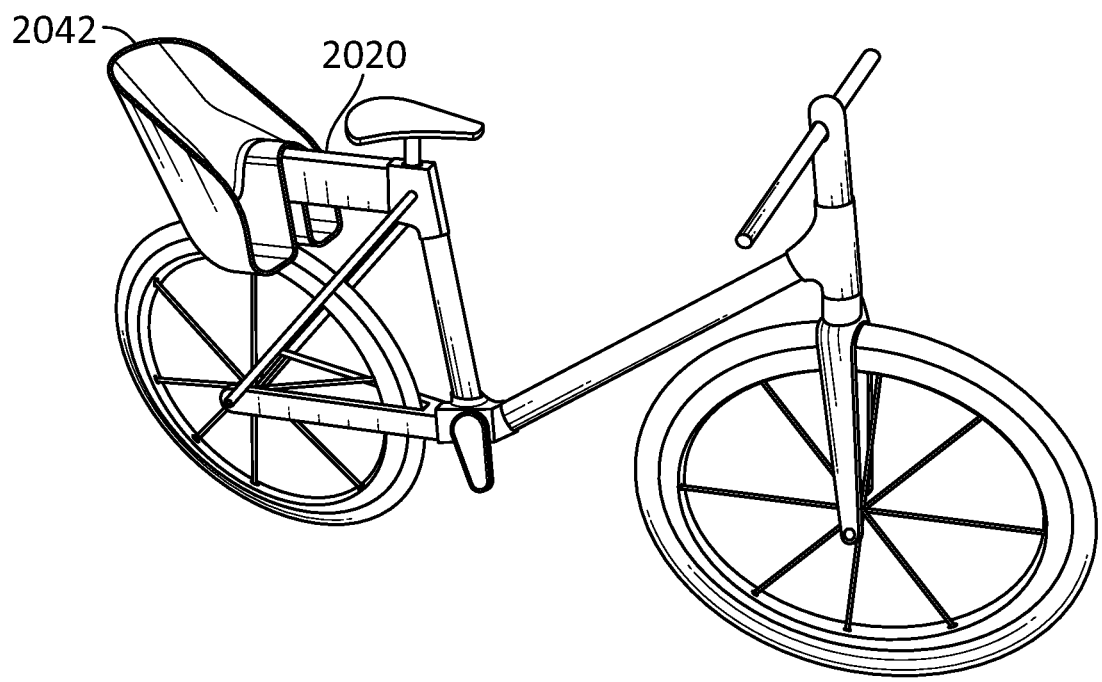
Figure 20C:
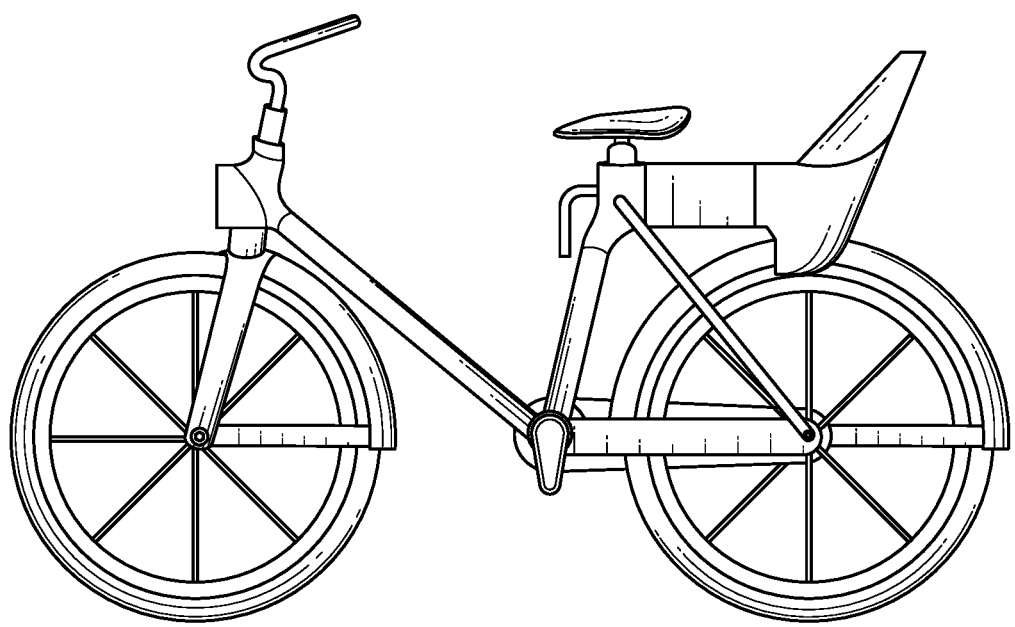

FIGS. 20A-20C illustrate various child seat assemblies added to a micro-mobility vehicle. In particular, FIGS. 20B and 20C illustrate the battery compartment structure 2020 (similar to the battery compartment 920) can be used to provide support for a child seat assembly 2042.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A micro-mobility vehicle, comprising:
    a frame comprising a seat tube;
    a battery pack comprising a connector;
    an electrical connector configured to receive electrical power from the battery pack and transfer the electrical power to an electric motor;
    a wireless communications module configured to notify a server via a network when a charge level of the battery pack is below a threshold determined based on an intended use of the micro-mobility vehicle;
    a battery compartment physically coupled to the seat tube and configured to secure the connector of the battery pack to the electrical connector, wherein the battery compartment comprises an opening at a first end that enables the battery pack to slide in and out of the battery compartment along a direction substantially parallel to the seat tube, and wherein the battery pack is substantially inside the battery compartment when slid in the battery compartment along the direction substantially parallel to the seat tube; and
    a visual indicator presented on the battery pack or the battery compartment, wherein the visual indicator is configured to display: (1) a charge level of the battery pack; and (2) one or more lighting patterns corresponding to one or more respective safety conditions.

2. The micro-mobility vehicle of claim 1, wherein the battery compartment is disposed inside the seat tube.

3. The micro-mobility vehicle of claim 1, wherein the battery compartment extends from the seat tube.

4. The micro-mobility vehicle of claim 3, wherein the battery compartment is substantially perpendicular to ground when the micro-mobility vehicle is in an operating orientation.

5. The micro-mobility vehicle of claim 1, wherein the visual indicator comprises a plurality of lights.

6. The micro-mobility vehicle of claim 5, wherein the battery pack is configured to turn on one or more of the plurality of lights based on the charge level of the battery pack.

7. The micro-mobility vehicle of claim 1, wherein the battery pack comprises the visual indicator, and wherein the visual indicator is located in a portion of the battery pack uncovered by the battery compartment when the battery pack is secured by the battery compartment and connected to the electrical connector.

8. The micro-mobility vehicle of claim 1, wherein a portion of the battery pack protrudes from the battery compartment when the battery pack is secured to the electrical connector, and wherein the visual indicator is disposed on the portion of the battery pack.

9. The micro-mobility vehicle of claim 1, further comprising a network interface configured to send a signal to a user device over the network in response to detecting that the charge level of the battery pack connected to the micro-mobility vehicle is below the threshold.

10. The micro-mobility vehicle of claim 9, further comprising a location component configured to determine a geographical location of the micro-mobility vehicle, wherein the signal sent to the user device comprises an indication of the geographical location.

11. The micro-mobility vehicle of claim 1, wherein the battery pack is a first battery pack and having a first size, wherein the battery compartment is further configured to secure a second battery pack having a second size different than the first size to the electrical connector.

12. The micro-mobility vehicle of claim 1, wherein the threshold is determined further based on a type of the battery pack.

13. A method, comprising:
    determining that a charge level of a first battery pack connected to a micro-mobility vehicle is below a threshold determined based on an intended use of the micro-mobility vehicle, wherein the first battery pack is substantially inside a battery compartment of the micro-mobility vehicle, wherein the charge level of the first battery pack being below a threshold is indicated by a visual indicator presented on the first battery pack or the battery compartment, and wherein the visual indicator is configured to display: (1) a charge level of the first battery pack and (2) one or more lighting patterns corresponding to one or more respective safety conditions;
    in response to the determining, removing the first battery pack by sliding the first battery pack out of the battery compartment of the micro-mobility vehicle through an opening of the battery compartment in a direction that is substantially parallel to a seat tube of the micro-mobility vehicle, wherein the battery compartment is physically coupled to the seat tube; and
    connecting a second battery pack to the micro-mobility vehicle by sliding the second battery pack along the direction into the battery compartment through the opening, wherein the second battery pack is substantially inside the battery compartment when slid in the battery compartment along the direction substantially parallel to the seat tube.

14. The method of claim 13, wherein the visual indicator is presented on the first battery pack.

15. The method of claim 14, wherein the visual indicator comprises one or more lights.

16. The method of claim 13, wherein the charge level of the first battery pack is determined to be below the threshold based on a signal received on a user device from the micro-mobility vehicle.

17. The method of claim 16, wherein the signal comprises a geographical location of the micro-mobility vehicle, and wherein the method further comprises traveling to the geographical location indicated in the signal.

18. The method of claim 13, wherein the first battery pack has a first size, and wherein the second battery pack has a second size different from the first size.

19. The method of claim 13, wherein the battery compartment is disposed along the seat tube of the micro-mobility vehicle, and wherein the method further comprises adjusting an orientation of a saddle of the micro-mobility vehicle coupled to the seat tube before removing the first battery pack from the micro-mobility vehicle.

20. The method of claim 19, further comprising re-adjusting the orientation of the saddle after connecting the second battery pack to the micro-mobility vehicle.

* * * * *